US012756685B1

(12) United States Patent
Beaver et al.

(10) Patent No.: US 12,756,685 B1
(45) **Date of Patent: *Oct. 6, 2026**

(54) CARDS, DEVICES, SYSTEMS, AND METHODS FOR ZONE-BASED NETWORK MANAGEMENT

(71) Applicant: Dynamics Inc., Cheswick, PA (US)

(72) Inventors: Jonathan L. Beaver, Bridgeville, PA (US); Benjamin C. Cupp, Verona, PA (US)

(73) Assignee: Dynamics Inc., Cheswick, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,060

(22) Filed: Jul. 8, 2022

Related U.S. Application Data

(63) Continuation of application No. 13/865,426, filed on Apr. 18, 2013, now Pat. No. 11,418,483.

(60) Provisional application No. 61/635,753, filed on Apr. 19, 2012.

(51) Int. Cl.
*H04L 9/40* (2022.01)

(52) U.S. Cl.
CPC ................................ *H04L 63/0209* (2013.01)

(58) Field of Classification Search
CPC .................................................. H04L 63/0209
See application file for complete search history.

(56) References Cited

U.S. PATENT DOCUMENTS 4,353,064 A 10/1982 Stamm
4,394,654 A 7/1983 Hofmann-Cerfontaine
4,614,861 A 9/1986 Pavlov et al.
4,667,087 A 5/1987 Quintana
4,701,601 A 10/1987 Francini et al.
4,720,860 A 1/1988 Weiss
4,786,791 A 11/1988 Hodama
4,791,283 A 12/1988 Burkhardt
(Continued)

FOREIGN PATENT DOCUMENTS

JP 05210770 8/1993
JP 05210770 A 8/1993
(Continued)

OTHER PUBLICATIONS

U.S. Appl. No. 60/594,300 Poidomani et al.
(Continued)

*Primary Examiner* — Simon P Kanaan

(57) ABSTRACT

A user is provided with a GUI that may allow the user to change functionality associated with a non-battery-powered card, a battery-powered card, a payment sticker, or another device (e.g., a mobile telephonic device). Such functionality may cause a network entity to deliver transaction details to a processing facility. The processing facility may be implemented with processing zones for scrubbing personal information from the transaction details and providing sanitized information to third party applications that may utilize the sanitized information for value. Third-party applications may interact with the processing facility via zone-based APIs to promote third-party software development within the processing facility and to promote third-party communications with the processing facility. Each of the processing zones may enforce security contexts such that processing zones of equal security contexts may communicate with other, while processing zones of unequal security contexts may not.

12 Claims, 11 Drawing Sheets

(56) References Cited

U.S. PATENT DOCUMENTS

| | | | |
|---|---|---|---|
| 4,797,542 | A | 1/1989 | Hara |
| 5,038,251 | A | 8/1991 | Sugiyama et al. |
| 5,168,520 | A | 12/1992 | Weiss |
| 5,237,614 | A | 8/1993 | Weiss |
| 5,276,311 | A | 1/1994 | Hennige |
| 5,347,580 | A | 9/1994 | Molva et al. |
| 5,361,062 | A | 11/1994 | Weiss et al. |
| 5,412,199 | A | 5/1995 | Finkelstein et al. |
| 5,434,398 | A | 7/1995 | Goldberg |
| 5,434,405 | A | 7/1995 | Finkelstein et al. |
| 5,478,994 | A | 12/1995 | Rahman |
| 5,479,512 | A | 12/1995 | Weiss |
| 5,484,997 | A | 1/1996 | Haynes |
| 5,485,519 | A | 1/1996 | Weiss |
| 5,585,787 | A | 12/1996 | Wallerstein |
| 5,591,949 | A | 1/1997 | Bernstein |
| 5,608,203 | A | 3/1997 | Finkelstein et al. |
| 5,623,552 | A | 4/1997 | Lane |
| 5,657,388 | A | 8/1997 | Weiss |
| 5,834,747 | A | 11/1998 | Cooper |
| 5,834,756 | A | 11/1998 | Gutman et al. |
| 5,856,661 | A | 1/1999 | Finkelstein et al. |
| 5,864,623 | A | 1/1999 | Messina et al. |
| 5,907,142 | A | 5/1999 | Kelsey |
| 5,913,203 | A | 6/1999 | Wong et al. |
| 5,937,394 | A | 8/1999 | Wong et al. |
| 5,955,021 | A | 9/1999 | Tiffany, III |
| 5,956,699 | A | 9/1999 | Wong et al. |
| 6,025,054 | A | 2/2000 | Tiffany, III |
| 6,045,043 | A | 4/2000 | Bashan et al. |
| 6,076,163 | A | 6/2000 | Hoffstein et al. |
| 6,085,320 | A | 7/2000 | Kaliski |
| 6,095,416 | A | 8/2000 | Grant et al. |
| 6,130,621 | A | 10/2000 | Weiss |
| 6,145,079 | A | 11/2000 | Mitty et al. |
| 6,157,920 | A | 12/2000 | Jakobsson et al. |
| 6,161,181 | A | 12/2000 | Haynes, III et al. |
| 6,176,430 | B1 | 1/2001 | Finkelstein et al. |
| 6,182,894 | B1 | 2/2001 | Hackett et al. |
| 6,189,098 | B1 | 2/2001 | Kaliski |
| 6,199,052 | B1 | 3/2001 | Mitty et al. |
| 6,206,293 | B1 | 3/2001 | Gutman et al. |
| 6,240,184 | B1 | 5/2001 | Huynh et al. |
| 6,241,153 | B1 | 6/2001 | Tiffany, III |
| 6,256,873 | B1 | 7/2001 | Tiffany, III |
| 6,269,163 | B1 | 7/2001 | Rivest et al. |
| 6,286,022 | B1 | 9/2001 | Kaliski, Jr. et al. |
| 6,308,890 | B1 | 10/2001 | Cooper |
| 6,313,724 | B1 | 11/2001 | Osterweil |
| 6,389,442 | B1 | 5/2002 | Yin et al. |
| 6,393,447 | B1 | 5/2002 | Jakobsson et al. |
| 6,411,715 | B1 | 6/2002 | Liskov et al. |
| 6,446,052 | B1 | 9/2002 | Juels |
| 6,460,141 | B1 | 10/2002 | Olden |
| 6,592,044 | B1 | 7/2003 | Wong et al. |
| 6,607,127 | B2 | 8/2003 | Wong |
| 6,609,654 | B1 | 8/2003 | Anderson et al. |
| 6,631,849 | B2 | 10/2003 | Blossom |
| 6,655,585 | B2 | 12/2003 | Shinn |
| 6,681,988 | B2 | 1/2004 | Stack et al. |
| 6,705,520 | B1 | 3/2004 | Pitroda et al. |
| 6,755,341 | B1 | 6/2004 | Wong et al. |
| 6,764,005 | B2 | 7/2004 | Cooper |
| 6,769,618 | B1 | 8/2004 | Finkelstein |
| 6,805,288 | B2 | 10/2004 | Routhenstein et al. |
| 6,811,082 | B2 | 11/2004 | Wong |
| 6,813,354 | B1 | 11/2004 | Jakobsson et al. |
| 6,817,532 | B2 | 11/2004 | Finkelstein |
| 6,873,974 | B1 | 3/2005 | Schutzer |
| 6,902,116 | B2 | 6/2005 | Finkelstein |
| 6,970,070 | B2 | 11/2005 | Juels et al. |
| 6,980,969 | B1 | 12/2005 | Tuchler et al. |
| 6,985,583 | B1 | 1/2006 | Brainard et al. |
| 6,991,155 | B2 | 1/2006 | Burchette, Jr. |
| 7,013,030 | B2 | 3/2006 | Wong et al. |
| 7,035,443 | B2 | 4/2006 | Wong |
| 7,039,223 | B2 | 5/2006 | Wong |
| 7,044,394 | B2 | 5/2006 | Brown |
| 7,051,929 | B2 | 5/2006 | Li |
| 7,083,094 | B2 | 8/2006 | Cooper |
| 7,100,049 | B2 | 8/2006 | Gasparini et al. |
| 7,100,821 | B2 | 9/2006 | Rasti |
| 7,111,172 | B1 | 9/2006 | Duane et al. |
| 7,114,652 | B2 | 10/2006 | Moullette et al. |
| 7,136,514 | B1 | 11/2006 | Wong |
| 7,140,550 | B2 | 11/2006 | Ramachandran |
| 7,163,153 | B2 | 1/2007 | Blossom |
| 7,195,154 | B2 | 3/2007 | Routhenstein |
| 7,197,639 | B1 | 3/2007 | Juels et al. |
| 7,219,368 | B2 | 5/2007 | Juels et al. |
| 7,225,537 | B2 | 6/2007 | Reed |
| 7,225,994 | B2 | 6/2007 | Finkelstein |
| 7,246,752 | B2 | 7/2007 | Brown |
| 7,298,243 | B2 | 11/2007 | Juels et al. |
| 7,334,732 | B2 | 2/2008 | Cooper |
| 7,337,326 | B2 | 2/2008 | Palmer et al. |
| 7,346,775 | B2 | 3/2008 | Gasparini et al. |
| 7,356,696 | B1 | 4/2008 | Jacobsson et al. |
| 7,357,319 | B1 | 4/2008 | Lin et al. |
| 7,359,507 | B2 | 4/2008 | Kaliski |
| 7,360,688 | B1 | 4/2008 | Harris |
| 7,363,494 | B2 | 4/2008 | Brainard et al. |
| 7,380,710 | B2 | 6/2008 | Brown |
| 7,398,253 | B1 | 7/2008 | Pinnell |
| 7,404,087 | B2 | 7/2008 | Teunen |
| 7,424,570 | B2 | 9/2008 | D'Albore et al. |
| 7,427,033 | B1 | 9/2008 | Roskind |
| 7,454,349 | B2 | 11/2008 | Teunen et al. |
| 7,461,250 | B1 | 12/2008 | Duane et al. |
| 7,461,399 | B2 | 12/2008 | Juels et al. |
| 7,472,093 | B2 | 12/2008 | Juels |
| 7,472,829 | B2 | 1/2009 | Brown |
| 7,494,055 | B2 | 2/2009 | Fernandes et al. |
| 7,502,467 | B2 | 3/2009 | Brainard et al. |
| 7,502,933 | B2 | 3/2009 | Jakobsson et al. |
| 7,503,485 | B1 | 3/2009 | Routhenstein |
| 7,516,492 | B1 | 4/2009 | Nisbet et al. |
| 7,523,301 | B2 | 4/2009 | Nisbet et al. |
| 7,530,495 | B2 | 5/2009 | Cooper |
| 7,532,104 | B2 | 5/2009 | Juels |
| 7,543,739 | B2 | 6/2009 | Brown et al. |
| 7,559,464 | B2 | 7/2009 | Routhenstein |
| 7,562,221 | B2 | 7/2009 | Nystrom et al. |
| 7,562,222 | B2 | 7/2009 | Gasparini et al. |
| 7,580,898 | B2 | 8/2009 | Brown et al. |
| 7,584,153 | B2 | 9/2009 | Brown et al. |
| 7,591,426 | B2 | 9/2009 | Osterweil et al. |
| 7,591,427 | B2 | 9/2009 | Osterweil |
| 7,602,904 | B2 | 10/2009 | Juels et al. |
| 7,631,804 | B2 | 12/2009 | Brown |
| 7,639,537 | B2 | 12/2009 | Sepe et al. |
| 7,641,124 | B2 | 1/2010 | Brown et al. |
| 7,660,902 | B2 | 2/2010 | Graham et al. |
| 7,828,207 | B2 | 11/2010 | Cooper |
| 2001/0034702 | A1 | 10/2001 | Mockett et al. |
| 2001/0047335 | A1 | 11/2001 | Arndt et al. |
| 2002/0059114 | A1 | 5/2002 | Cockrill et al. |
| 2002/0082989 | A1 | 6/2002 | Fife et al. |
| 2002/0096570 | A1 | 7/2002 | Wong et al. |
| 2002/0120583 | A1 | 8/2002 | Keresman, III et al. |
| 2003/0034388 | A1 | 2/2003 | Routhenstein et al. |
| 2003/0052168 | A1 | 3/2003 | Wong |
| 2003/0057278 | A1 | 3/2003 | Wong |
| 2003/0116635 | A1 | 6/2003 | Taban |
| 2003/0152253 | A1 | 8/2003 | Wong |
| 2003/0163287 | A1 | 8/2003 | Vock et al. |
| 2003/0173409 | A1 | 9/2003 | Vogt et al. |
| 2003/0179909 | A1 | 9/2003 | Wong et al. |
| 2003/0179910 | A1 | 9/2003 | Wong |
| 2003/0226899 | A1 | 12/2003 | Finkelstein |
| 2004/0035942 | A1 | 2/2004 | Silverman |
| 2004/0133787 | A1 | 7/2004 | Doughty |
| 2004/0162732 | A1 | 8/2004 | Rahim et al. |
| 2004/0172535 | A1 | 9/2004 | Jakobsson |

(56) References Cited

U.S. PATENT DOCUMENTS

| | | | |
|---|---|---|---|
| 2004/0177045 | A1 | 9/2004 | Brown |
| 2005/0043997 | A1 | 2/2005 | Sohata et al. |
| 2005/0080747 | A1 | 4/2005 | Anderson et al. |
| 2005/0086160 | A1 | 4/2005 | Wong et al. |
| 2005/0086177 | A1 | 4/2005 | Anderson et al. |
| 2005/0116026 | A1 | 6/2005 | Burger et al. |
| 2005/0119940 | A1 | 6/2005 | Concilio et al. |
| 2005/0154643 | A1 | 7/2005 | Doan et al. |
| 2005/0228959 | A1 | 10/2005 | D'Albore et al. |
| 2006/0000900 | A1 | 1/2006 | Fernandes et al. |
| 2006/0037073 | A1 | 2/2006 | Juels et al. |
| 2006/0041759 | A1 | 2/2006 | Kaliski et al. |
| 2006/0085328 | A1 | 4/2006 | Cohen et al. |
| 2006/0091223 | A1 | 5/2006 | Zellner |
| 2006/0161435 | A1 | 7/2006 | Atef et al. |
| 2006/0163353 | A1 | 7/2006 | Moulette et al. |
| 2006/0174104 | A1 | 8/2006 | Crichton et al. |
| 2006/0196931 | A1 | 9/2006 | Holtmanns et al. |
| 2006/0256961 | A1 | 11/2006 | Brainard et al. |
| 2007/0034700 | A1 | 2/2007 | Poidomani et al. |
| 2007/0114274 | A1 | 5/2007 | Gibbs et al. |
| 2007/0124321 | A1 | 5/2007 | Szydlo et al. |
| 2007/0152070 | A1 | 7/2007 | D'Albore |
| 2007/0152072 | A1 | 7/2007 | Frallicciardi et al. |
| 2007/0153487 | A1 | 7/2007 | Frallicciardi et al. |
| 2007/0174614 | A1 | 7/2007 | Duane et al. |
| 2007/0192249 | A1 | 8/2007 | Biffle et al. |
| 2007/0241183 | A1 | 10/2007 | Brown et al. |
| 2007/0241201 | A1 | 10/2007 | Brown et al. |
| 2007/0256123 | A1 | 11/2007 | Duane et al. |
| 2007/0291753 | A1 | 12/2007 | Romano |
| 2008/0005510 | A1 | 1/2008 | Sepe et al. |
| 2008/0008315 | A1 | 1/2008 | Fontana et al. |
| 2008/0008322 | A1 | 1/2008 | Fontana et al. |
| 2008/0010675 | A1 | 1/2008 | Massascusa et al. |
| 2008/0016351 | A1 | 1/2008 | Fontana et al. |
| 2008/0019507 | A1 | 1/2008 | Fontana et al. |
| 2008/0028447 | A1 | 1/2008 | O'Malley et al. |
| 2008/0040271 | A1 | 2/2008 | Hammad et al. |
| 2008/0040276 | A1 | 2/2008 | Hammad et al. |
| 2008/0058016 | A1 | 3/2008 | DiMaggio et al. |
| 2008/0059379 | A1 | 3/2008 | Ramaci et al. |
| 2008/0096326 | A1 | 4/2008 | Reed |
| 2008/0126398 | A1 | 5/2008 | Cimino |
| 2008/0128515 | A1 | 6/2008 | Di lorio |
| 2008/0148394 | A1 | 6/2008 | Poidomani et al. |
| 2008/0201264 | A1 | 8/2008 | Brown et al. |
| 2008/0209550 | A1 | 8/2008 | Di Lorio |
| 2008/0288699 | A1 | 11/2008 | Chichierchia |
| 2008/0294930 | A1 | 11/2008 | Varone et al. |
| 2008/0302877 | A1 | 12/2008 | Musella et al. |
| 2009/0013122 | A1 | 1/2009 | Sepe et al. |
| 2009/0036147 | A1 | 2/2009 | Romano |
| 2009/0046522 | A1 | 2/2009 | Sepe et al. |
| 2009/0108064 | A1 | 4/2009 | Fernandes et al. |
| 2009/0150295 | A1 | 6/2009 | Hatch et al. |
| 2009/0152365 | A1 | 6/2009 | Li et al. |
| 2009/0242648 | A1 | 10/2009 | Di Sirio et al. |
| 2009/0244858 | A1 | 10/2009 | Di Sirio et al. |
| 2009/0253460 | A1 | 10/2009 | Varone et al. |
| 2009/0255996 | A1 | 10/2009 | Brown et al. |
| 2009/0290704 | A1 | 11/2009 | Cimino |
| 2009/0303885 | A1 | 12/2009 | Longo |
| 2011/0028184 | A1 | 2/2011 | Cooper |

FOREIGN PATENT DOCUMENTS

| | | |
|---|---|---|
| WO | WO9852735 | 11/1998 |
| WO | WO0247019 | 6/2002 |
| WO | WO06066322 | 6/2006 |
| WO | WO06080929 | 8/2006 |
| WO | WO06105092 | 10/2006 |
| WO | WO06116772 | 11/2006 |
| WO | WO08064403 | 6/2008 |

OTHER PUBLICATIONS

U.S. Appl. No. 60/675,388 Poidomani et al.

The Bank Credit Card Business. Second Edition, American Bankers Association, Washington, D.C., 1996.

A Day in the Life of a Flux Reversal. http://www.phrack/org/issues.html?issue=37&id=6#article as viewed on Apr. 12, 2010.

Dynamic Virtual Credit Card Numbers. http://homes.cerias.purdue.edu/~jtli/paper/fc07.pdf. As viewed on Apr. 12, 2010.

English translation of JP 05210770 A.

200

400

CARDS, DEVICES, SYSTEMS, AND METHODS FOR ZONE-BASED NETWORK MANAGEMENT

CROSS-REFERENCE TO RELATED APPLICATION

This application is a continuation of application Ser. No. 13/865,426, titled "CARDS, DEVICES, SYSTEMS, AND METHODS FOR ZONE-BASED NETWORK MANAGEMENT," filed on Apr. 18, 2013, which claims the benefit of U.S. Provisional Patent Application No. 61/635,753, titled "CARDS, DEVICES, SYSTEMS, AND METHODS FOR ZONE-BASED NETWORK MANAGEMENT," filed Apr. 19, 2012, each of which is hereby incorporated by reference herein in its entirety.

BACKGROUND OF THE INVENTION

This invention relates to magnetic cards and devices and associated payment systems.

SUMMARY OF THE INVENTION

Systems and methods are provided for allowing a user to select an additional service to be performed in addition to the payment of goods with a payment card or other device (e.g., a mobile telephonic device, a tablet computer device, or another electronic device). A card, or other device, may include one or more buttons. A user may associate an additional service to a button of a card at any time. At the time of purchase, information indicative of the button that the user selected may be passed to a point-of-sale system with a user's payment information. Such data may be, for example, communicated through a merchant acquirer's network to a processing facility. The processing facility may, for example, authorize a payment transaction and forward the information indicative of the button a user selected and the identity of a user to a remote facility. Such a remote facility may, for example, forward at least some of such information, as well as additional information, to a third party application such that the third party application enacts the additional feature desired by the user.

Such an additional feature may include, for example, a game action in an online game by a game application, a check-in operation at a location by a check-in application, redemption of a coupon or voucher by a third party application, accumulation of loyalty points by a third party loyalty application, rating of a transaction or location by a rating application, any combination of such features, or any additional feature.

Selection of an application may be provided, for example, by a Graphical User Interface (GUI) provided on a computing device (e.g., a mobile telephonic device) as a software application for that device or via the internet or an intranet through a web browser. Such a selection may be provided with a non-powered card such that a single feature may be associated with a card for a period of time. Such a selection may be associated to an option (e.g., a button) on a powered card or other device (e.g., a mobile telephonic device) such that the user may associate different features with different options (e.g., different buttons). Accordingly, for example, a user may receive a powered card, or other device, in the mail and use his/her web browser to associate different additional features to different buttons. The user may then utilize the card in a store and press a button in order to select that feature. A card, or other device, may download information (e.g., via a wireless communication such as a light or electromagnetic communication) such that the card, or other device, displays information next to an option indicative of the application (e.g., "Redeem LivingSocial Voucher" or "Facebook Like"). Alternatively, no download may be provided and no additional information may be displayed such that a user's card, or other device, includes a generic descriptor (e.g., "credit" and "application," or "application 1" and "application 2," or "debit" and "application 1" and "application 2").

A remote facility may also receive additional information other than just a user identifier and information indicative of the option selected by a user (or that the user made a payment). Such additional information may be, for example, the type of merchant (e.g., a retail merchant or a gas merchant), the location of a merchant (e.g., the zip code of a merchant), the type of transaction (e.g., online or in-store purchase), the name of the merchant (e.g., "Amazon.com," or "Walmart"), the amount of the transaction (e.g., $10.25), and any other information. Such a remote facility may forward such information to a third party application in addition to information generated by the remote facility (e.g., a second user identifier such that different identifiers are used with the facility sending payment information and the third party application).

An ecosystem may be provided in which a development kit is available for third parties to develop applications for payment cards or other devices. A GUI may be provided where a user can select different third party applications to be associated with a user's payment. The third party applications may need to be approved by an administrator before being accessible by a GUI. Different categories of third party applications may be provided on the GUI (e.g., a coupon category, a check-in category, a games category, a financial management tools category). The development kit may provide the ability for a third party application to, for example, receive user identification numbers and other information (e.g., merchant name and location) and provide particular information back (e.g., within a period of time) to a remote facility.

Information received from a third party application may include, for example, information indicative that the user was properly identified and a service was performed (e.g., "check-in completed," "information added to financial management service."). Such information may be provided back to an issuing bank, processor, or other service provider such that the information may be displayed on a user's bill statement. Additional information may also be provided that may change the way a transaction is authorized or settled.

Additional information received from a third party may be utilized to change the way a transaction is authorized or settled. For example, a third party may provide a user with the ability to pre-purchase a voucher to a particular store (e.g., a particular barber in a particular zip code). A user may associate this third party service to a button on the user's card. A user may make a purchase at this barber multiple times during a year on the user's credit account. The user may, at one such purchase, press the button associated with the desire to use the third party service and redeem a voucher the user already purchased or acquired. Information indicative of the user's desire to utilize such a service may be communicated to a point-of-sale terminal via a communications device located on the card (e.g., a dynamic magnetic stripe communications device, an RFID antenna, an exposed IC chip (e.g., an EMV chip, or any other communications device). The transaction may be authorized using the user's payment account if, for example, the user has enough funds associated with that account (e.g., a credit or debit account). The third party service provider may then determine the user had a pre-paid voucher for the transaction and may return to the card issuer, processor, or other party information indicative that the user's bill is to be adjusted by the amount of the voucher. Before, or after, settlement occurs a user's bill may show a statement credit in the amount of the voucher. A remote facility may perform such a data exchange as well as any associated value exchange. For example, the remote facility may, for a fee (e.g., a percentage of a transaction or a fixed fee), provide value from the third party service provider to the card issuer or processor (e.g., via an ACH or other type of monetary transaction). Alternatively, for example, the remote facility may provide the desired value to the card issuer, processor, or other party and demand the associated value be paid to the remote facility by the third party application within a period of time (e.g., three days). Information provided by a third party application to a remote facility may include an identifier indicative of the third party application, an identifier indicative of the user, an identifier indicative of the type of service provided by the third party application, an identifier indicative of the transaction with which further action by the third party application is desired, an amount of a post-statement credit that is to be applied for a particular transaction, and amount of a post-settlement credit that is to be applied for a particular transaction, an amount of a pre-settlement credit that is to be applied for a particular transaction, an amount of a credit that is to be applied during an authorization, an additional fee that is supposed to be added to a statement for an additional service (e.g., a fee-based financial management tool service), and any other information desired by the third party service provider, processor, card issuer, remote facility, device provider, or any other entity (e.g., a card network).

Information indicative of a button press, or use of a card, that triggers a feature may be provided in a payment message utilized at authorization or at settlement. Furthermore, the service provider may return information in a period of time that permits actions to be performed pre-authorization or pre-settlement.

The payment actions may be determined, for example, via a user interaction with the card. Particularly, for example, a user may press a button on the card, from a group of buttons, that is associated with the third party feature. Such third party features may be unique from the features provided to the user via the third parties non-payment card or device services. Accordingly, a user may obtain the benefit of the whimsical and festive nature of a unique feature every time the user makes a payment. Information indicative of feature selection may be provided, for example, via an output device operable to be read by a card reader. For example, the feature may be provided by a dynamic magnetic stripe communications device, an RFID antenna, an exposed IC chip, or any other type of card reader. For online purchases, for example, a display may be provided on the card and a user selection may cause a particular number (e.g., a particular code) to be displayed on the card. Such a code may be entered into a text box on a website at checkout and may be representative of the user's desired feature. Accordingly, the feature may be communicated to a remote server such that the feature may be performed in the third party service on behalf of the user. The code may additionally provide the benefits of a security code and may be entered with a payment card number (e.g., a credit or debit card number) at online or in-store checkout.

Rewards may be awarded based on the amount of a purchase. Such rewards may be associated with a third party service or a card issuer, device or card provider, or other entity. For example, an amount of game currency may be awarded by a game provider at every purchase instead of a card issuer providing an amount of points, miles, or cash-back to a user. Alternatively, for example, a user may earn both rewards from a card issuer as well as rewards from a third party service provider. A user may select, via, for example, physical buttons on the card or virtual buttons on a capacitive-sensitive display of a mobile telephonic device, the type of feature the user desires. Multiple features may be provided from a particular third party service provider. For example, a game service provider may provide a feature associated with one game action and another feature associated with another game action.

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, LED, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A device for receiving wireless information signals may be provided. A light sensing device or sound sensing device may be utilized to receive information wirelessly. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, dynamic magnetic stripe devices, light sensing device, and a sound sensing device). A processor may be coupled to surface contacts such that the processor may perform the processing capabilities of, for example, an EMV chip. The processor may be laminated over and not exposed such that such a processor is not exposed on the surface of the card.

A card may be provided with a button in which the activation of the button causes a code to be communicated through a dynamic magnetic stripe communications device (e.g., the subsequent time a read-head detector on the card detects a read-head). The code may be indicative of, for example, a feature (e.g., a payment feature). The code may be received by the card via manual input (e.g., onto buttons of the card) or via a wireless transmission (e.g., via light, electromagnetic communications, sound, or other wireless signals). A code may be communicated from a webpage (e.g., via light and/or sound) to a card. A card may include a display such that a received code may be visually displayed to a user. In doing so, the user may be provided with a way to select, and use, the code via both an in-store setting (e.g., via a magnetic stripe reader) or an online setting (e.g., by reading the code from a display and entering the code into a text box on a checkout page of an online purchase transaction). A remote server, such as a payment authorization server, may receive the code and may process a payment differently based on the code received. For example, a code may be a security code to authorize a purchase transaction. A code may provide a payment feature such that a purchase may be made with points, debit, credit, installment payments, or deferred payments via a single payment account number (e.g., a credit card number) to identify a user and a payment feature code to select the type of payment a user desires to utilize.

A dynamic magnetic stripe communications device may include a magnetic emulator that comprises an inductor (e.g., a coil). Current may be provided through this coil to create an electromagnetic field operable to communicate with the read-head of a magnetic stripe reader. The drive circuit may fluctuate the amount of current travelling through the coil such that a track of magnetic stripe data may be communicated to a read-head of a magnetic stripe reader. A switch (e.g., a transistor) may be provided to enable or disable the flow of current according to, for example, a frequency/double-frequency (F2F) encoding algorithm. In doing so, bits of data may be communicated.

Electronics may be embedded between two layers of a polymer (e.g., a PVC or non-PVC polymer). One or more liquid polymers may be provided between these two layers. The liquid polymer(s) may, for example, be hardened via a reaction between the polymers (or other material), temperature, or via light (e.g., an ultraviolet or blue spectrum light) such that the electronics become embedded between the two layers of the polymer and a card is formed.

A payment card or other device may receive information indicative of a feature desired to be added by a user. The payment card may communicate information indicative of the feature with payment card data associated with the card or a user selection. The payment data and feature information may be routed, for example, to an authorization server. The authorization server may authorize payment and, based on the authorized payment, communicate the feature information to a remote server. The remote server may utilize this remote information to impact a third party service. The feature information may, for example, be routed before the payment card data reaches an authorization server. At merchant settlement, charge backs for a purchase associated with a game action may cause the feature to be reversed or a different feature to be implemented (e.g., a removal of rewards earned at authorization). The feature may be implemented at settlement upon confirmation that, for example, no chargeback was associated with the payment transaction.

A remote facility may be implemented as a zone-based network. Each zone of such a zone-based network may operate within a specific security context that may be enforced by a firewall of that zone. For example, each firewall may be associated with a deep-space network address that may only be known by other zones of equal security context. Accordingly, for example, zones of different security contexts (e.g., lower or higher security contexts) may not access each other.

Each zone may host one or more devices (e.g., servers, switches, processors, databases and the like) to perform one or more functions that may be associated with that zone. A bank zone may, for example, be established that communicates with network entities (e.g., payment processors) to receive network messages (e.g., authorization advice messages and batch processing messages). The bank zone may sanitize such messages by replacing a personal payment number (PAN) with a generic user ID (GUID) and queue the sanitized messages for use by another zone. A PAN zone may support the bank zone to correlate each PAN with an associated GUID. The bank zone may construct authorization advice reply messages and send them back to network entities (e.g., payment processors) as handshake mechanisms.

A transaction zone may be established in the zone-based network to receive sanitized messages (e.g., trevents). The transaction zone may provide the trevents to a long-term storage data warehouse. The transaction zone may also provide the trevents to a database for short-term storage and subsequent retrieval by some of the other zones within the zone-based network.

An event zone may retrieve trevents from the database and may communicate the trevents to third parties for additional processing. Such additional processing may include piggyback transactions and statement credit transactions that may be performed based on previous purchase transactions initiated by a card or device. The event zone may receive trevents submitted by third parties, such as piggyback transaction requests, so that the zone-based network may request a network entity (e.g., a merchant acquirer) to process the piggyback transaction within the payment network.

A DMZ zone may be established within the zone-based network to provide an application programming interface (API). A developer API website may provide access to the DMZ zone by third-party software developers who may wish to develop, test, and deploy applications for use within the zone-based network. Third-party applications may access an API of the DMZ zone to perform third party actions (e.g., request piggyback transactions and statement credit transactions).

A finance zone may be established within the zone-based network. A device within the finance zone may execute an accounting programming language (APL) interface that may allow a user to define/program accounting operations that may be executed based upon the various transactions that may be processed by the zone-based network of the remote facility.

A management zone may be created within the zone-based network to monitor the health of each device in each respective zone. The management zone may alert network operators that a particular device may be defective and may need replacement. Upon replacement of the defective device, the management zone may automatically reconfigure the new device for deployment within the zone-based network by accessing configuration parameters from a configuration file (e.g., an XML configuration file) that may define an operational configuration of the new device. A backup zone may generate backups of each device in every other zone and may store such backups within storage devices of the backup zone at regular intervals (e.g., every 15 minutes).

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
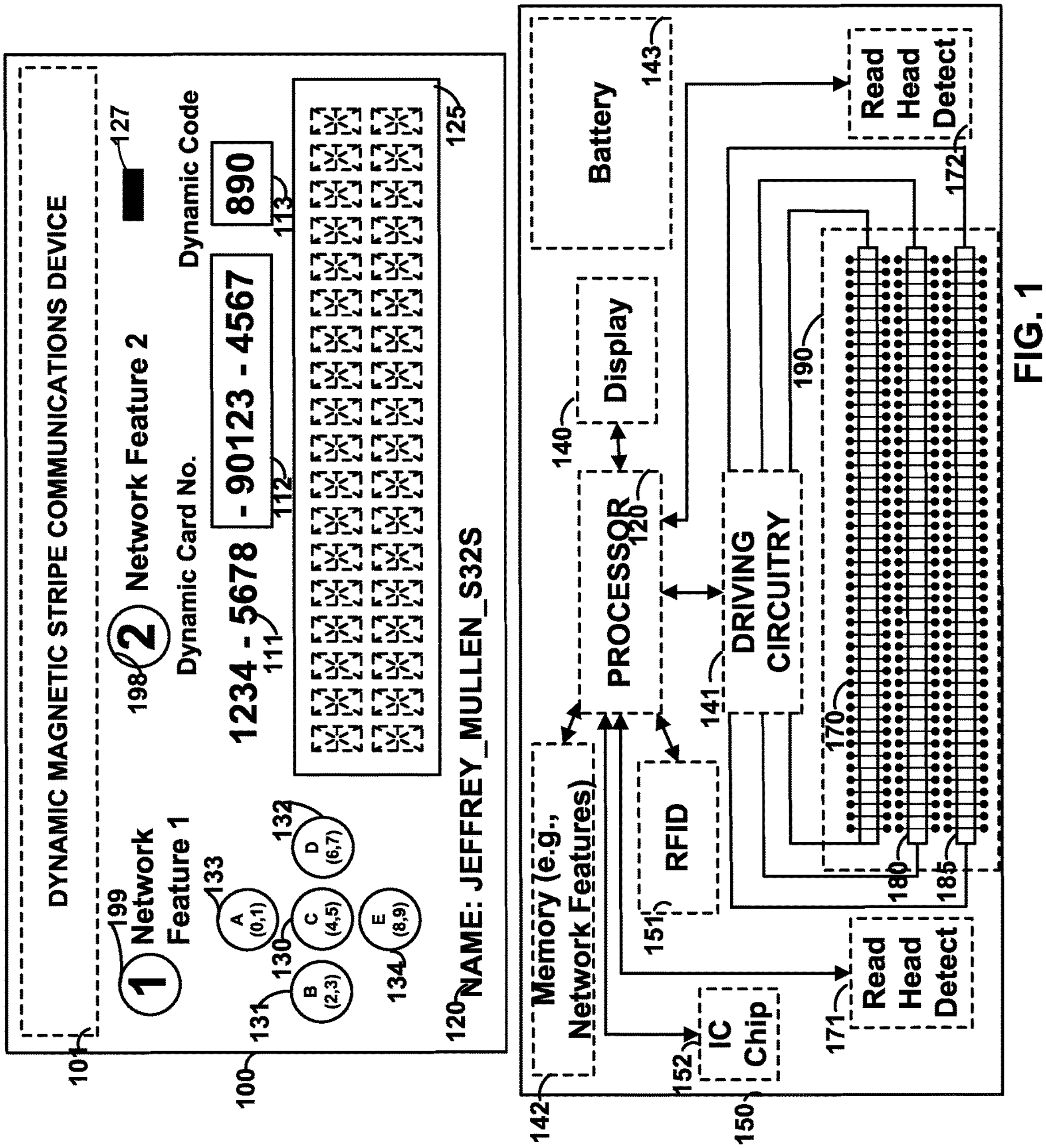
FIG. 1 is an illustration of a card and architecture constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, as well as multiple lines of information. A display may be a bi-stable display or non bi-stable display. Permanent information 120 may also be included and may include information such as information specific to a user (e.g., a user's name or username) or information specific to a card (e.g., a card issue date and/or a card expiration date). Card 100 may include one or more buttons such as buttons 130-134. Such buttons may be mechanical buttons, capacitive buttons, or a combination or mechanical and capacitive buttons. Card 100 may include button 199. Button 199 may be used, for example, to communicate information through dynamic magnetic stripe communications device 101 indicative of a user's desire to communicate details of a network transaction to a third-party. Persons skilled in the art will appreciate that pressing a button (e.g., button 199) may cause information to be communicated through device 101 when an associated read-head detector detects the presence of a read-head of a magnetic stripe reader. Button 198 may be utilized to communicate (e.g., after button 198 is pressed and after a read-head detects a read-head of a reader) information indicative of a user selection (e.g., to communicate details of a network transaction to a different third-party as may be selected by pressing button 199). Multiple buttons may be provided on a card and each button may be associated with different user selections. Light sensor 127 may be provided, for example, to receive information from a display (e.g., a display of a mobile telephonic device or a laptop computer). Display 125 may allow a user to select (e.g., via buttons) options on the display that instruct the card to communicate (e.g., via a dynamic magnetic stripe communications device, RFID, or exposed IC chip) to use a debit account, credit account, pre-paid account, or point account for a payment transaction. Button 198 and button 199 may each be associated with, for example, a different third party feature and may be changed by a user at any time. The third party feature associated with a button may be changed by a user on a GUI provided by a device provider, remote facility provider, card issuer, processor, or any other entity. For example, a third party service provider may, on its website or application, allow a user to change the third party feature performed when the third party's feature button is selected by a user on the user's card or other device. For example, suppose a third party service provider provides a check-in feature at particular stores and then presents the fact that the user has checked into a location on a profile page of the user. One action may be to check-into the location using a payment transaction as the check-in. When a transaction is performed, a user's profile may be updated that the user has checked-into that location. When a purchase transaction is performed, a user's profile may be updated that the user has made a purchase at the check-in. Another action may be to use a purchased product as the check-in. When a transaction is performed, a user's profile may be updated that the user has made a purchase of a particular item at the check-in. For example, a user may be provided with a GUI (e.g., on a mobile telephonic device of the user) when the user makes a purchase to identify the goods that the user has purchased. In doing so, features may be enhanced with additional information from a user after a purchase has been made.

The selection of a feature may or may not have a cost associated with it. If a cost is associated with the feature, for example, the cost may be added to a customer's statement (e.g., added to a credit or debit purchase) for a particular transaction. A fixed-fee or variable-fee (e.g., a percentage of the transaction) may then be removed from the fee charged to the user and distributed among particular parties (e.g., distributed among the card issuer and/or device provider). The remainder of the fee may be provided, for example, to the third party service provider. A cost may be associated with a feature selection, but may not be a cost to a user. Instead, for example, the cost may be a cost to a third party service provider. The cost may be provided, for example, to other entities such as, for example, the device provider, card issuer, card processor (which may be the same, for example, as the card issuer), or any other entity (e.g., card network).

Architecture 150 may be utilized with any card. Architecture 150 may include processor 120. Processor 120 may have on-board memory for storing information (e.g., network features). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120. Memory 142 may be coupled to processor 120. Memory 142 may include data, for example, that is unique to a particular card. Memory 142 may include any type of data. For example, memory 142 may store discretionary data codes associated with buttons of a card (e.g., card 100 of FIG. 1). Such codes may be recognized to effect particular actions. For example, a code may be stored on memory 142 that causes a third party service feature to be initiated by a remote facility (e.g., a zone-based network coupled to a third party service such as an online voucher or coupon provider). Different third party features may be associated with different buttons. Or, for example, a user may scroll through a list of features on a display on the front of the card (e.g., using buttons to scroll through the list). A user may select the type of payment on card 100 via manual input interfaces corresponding to displayed options on display 125. Selected information may be communicated to a magnetic stripe reader via a dynamic magnetic stripe communications device. Selected information may also be communicated to a device (e.g., a mobile telephonic device) having a capacitive sensor or other type of touch sensitive sensor.

A card may include, for example, any number of light sensors. Light sensors may be utilized such that a display screen, or other light emitting device, may communicate information to light sensors 127 via light.

Any number of reader communication devices may be included in architecture 150. For example, IC chip 152 may be included to communicate information to an IC chip reader. IC chip 152 may be, for example, an EMV chip. As per another example, RFID 151 may be included to communicate information to an RFID reader. A magnetic stripe communications device may also be included to communicate information to a magnetic stripe reader. Such a magnetic stripe communications device may provide electromagnetic signals to a magnetic stripe reader. Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a soft-magnetic material and a non-magnetic material). Each electromagnetic field generator may communicate information serially to a receiver of a magnetic stripe reader for particular magnetic stripe track. Read-head detectors 171 and 172 may be utilized to sense the presence of a magnetic stripe reader (e.g., a read-head housing of a magnetic stripe reader). This sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time. Processor 120 may, for example, communicate user-specific and card-specific information through RFID 151, IC chip 152, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185.

Architecture 150 may also include, for example, a light sensor. Architecture 150 may receive information from a light sensor. Processor 120 may determine information received by a light sensor.

Figure 2:
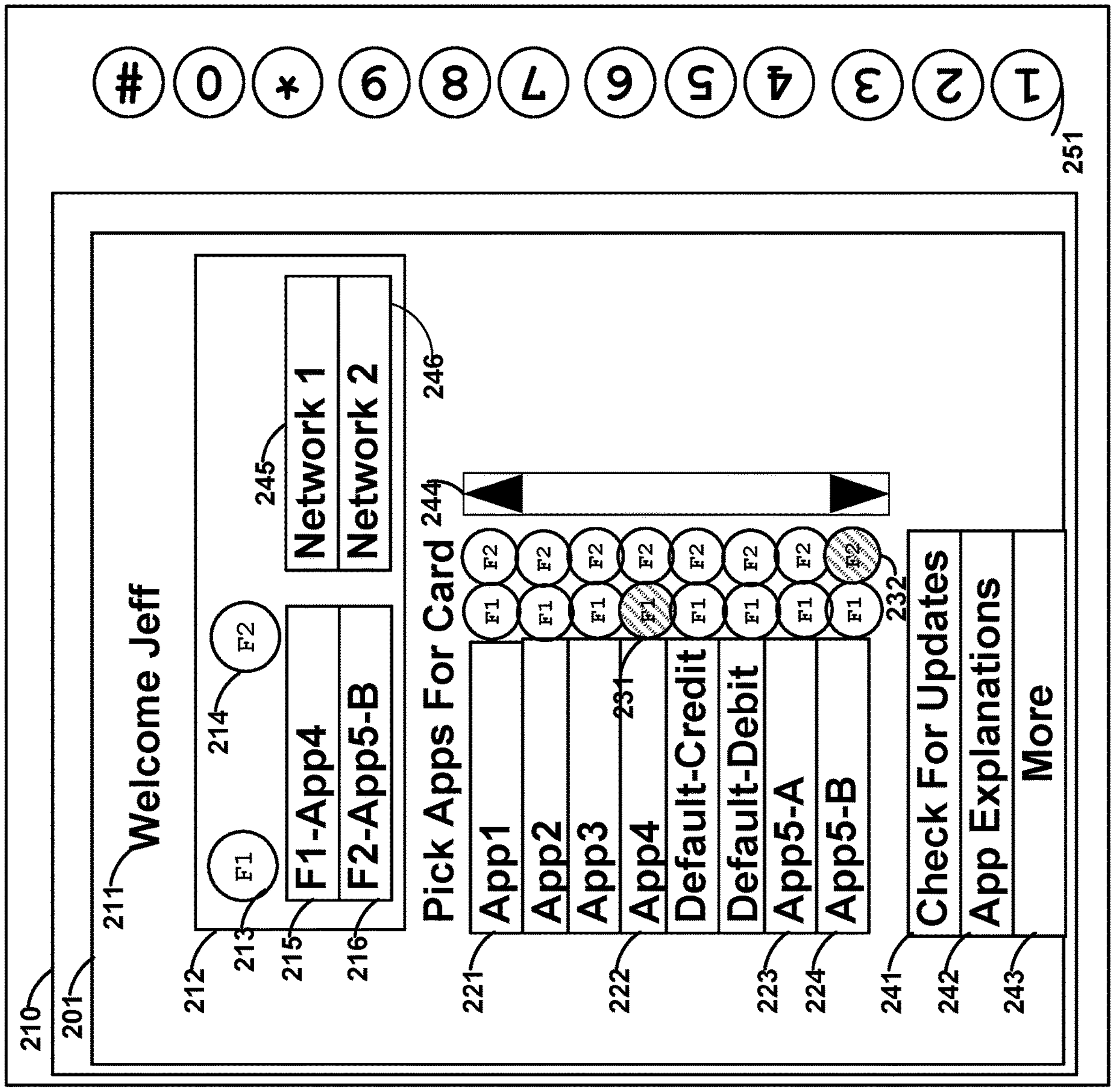
FIG. 2 is an illustration of a device constructed in accordance with the principles of the present invention.

FIG. 2 shows device 200. Device 200 may include one or more physical buttons 251, display screen 210 (e.g., a touch display screen such as a capacitive-touch or resistive-touch display screen), GUI 201, text 211, virtual card 212, virtual indicia 213 and 214, field descriptors 215 and 216, network feature selections 245 and 246, applications 221-224, selection options 231, 232, and 241-243.

A user may associate a card, such as a powered or non-powered card, with an application manager for managing third party service features. Such an application manager may be provided, for example, on a remote facility's zone-based network and displayed on a graphical user interface to allow a user to change the third party service features associated with a card. In this manner, a user may utilize a GUI to be provided with an ecosystem of applications and may, for example, select, at any time, a particular feature to associate with a card or a card button. Persons skilled in the art will appreciate that a default feature may be provided or that a number of features provided by a card issuer or entity may be provided in addition to third party service features. For example, a card issuer may provide a card with a default on one button for credit and a default for a second button as decoupled debit. A user may press the first button to perform a credit transaction. A user may press the other button to perform a decoupled debit transaction.

Virtual card 212 may be provided as a representation of a user's physical card associated with an application manager. A user may be provided with the ability to change between multiple physical cards and configure the features associated with those multiple physical cards. Accordingly, virtual card 212 may be provided with indicia 213 in the configuration of, and indicative of, one physical button associated with a user's physical card and virtual card 212 may be provided with indicia 214 in the configuration of, and indicative of, another physical button associated with a user's physical card. Fields 215 and 216 may include the features associated with each button. Accordingly, a user may, for example, view virtual card 212 in order to refresh the user's memory on the features associated with the physical buttons on a user's physical card (not shown). GUI 201 may be, for example, provided as an application for a device (e.g., a portable computing device or a mobile telephonic device) or retrieved information from a web browser. Text 211 may, for example, identify the user associated with virtual card 212 and the corresponding physical card (not shown).

A list of applications may be provided on a card. Such applications may provide features for a third party service provider. A user may, for example, select that different applications be associated with a particular card or a particular button on a card. For example, selection 231 may associate application 222 to the physical button of a card associated with virtual button 213. Selection 232 may associate application 224 to the physical button of a card associated with virtual button 214. In doing so, a user may change the features of a card by using GUI 201. A physical card (not shown) may communicate information indicative of the button that was pressed with other payment data (e.g., an account number, security code, and other data). For example, information indicative of the button that was pressed may be included in discretionary data of a payment message. A payment message may be, for example, one or more tracks of magnetic stripe data (e.g., communicated from a dynamic magnetic stripe communications device), an RFID message (e.g., an NFC message from a radio frequency antenna), or an exposed IC chip message (e.g., an EMV message) from an exposed IC chip. Such information may be passed to a card issuer or processor from a point-of-sale and any intermediary devices (e.g., a merchant acquirer processing server) and the information may be passed to a remote facility's zone-based network (e.g., a facility providing an application manager) such that the remote facility's zone-based network may determine the button that was pressed by a user. This remote facility may, in turn, retrieve information associated with the third party feature (or a feature of a card issuer, processor, application manager provider, or any entity) and forward information to that feature provider such that the feature may be performed.

Additional information may be returned to the entity that provided the information indicative of the button the user pressed. Persons skilled in the art will appreciate that if, for example, a non-powered card is utilized then information indicative that a purchase was made may be provided to an application manager provider such that the application manager provider can initiate the desired feature for the non-powered card. For non-powered cards, for example, features may be associated with different types of purchases such as, for example, one feature may be provided for a particular merchant type (e.g., a game feature for gas purchases) and another feature may be provided for a different merchant type (e.g., a reward feature for transportation purchases). Features may be associated with other characteristics of a purchase such as, for example, a purchase above a particular amount (e.g., at or above $100) or a purchase below a particular amount (e.g., below $100). Such additional feature selections may be provided, for example, for powered cards and devices.

GUI 201 may be provided, for example, on a card issuer's website such as, for example, on a bill statement web page. GUI 201 may be provided, for example, above the bill statement or to the right of the bill statement. Accordingly, for example, a user may utilize the application manager to manage application features when the user is logged into his/her account. Similarly, a third party service provider may utilize GUI 201 as part of a user's administration or experience of that third party service. Accordingly, for example, a user's profile page for a third party service may include GUI 201. In this manner, an application manager provider may provide web-code that retrieves GUI 201 from a remote facility's zone-based network managed by the application manager provider. Selection 241 may be utilized by a user to check for updates (e.g., confirm that a feature was changed or if any updates are present). Selection 242 may be utilized to explain the functionality of a particular application feature. Selection 243 may be utilized for additional selection options. Scroll tool 244 may be used, for example, to scroll through a list of applications and selection options.

A card may be provided with one button for a particular payment account (e.g., credit) and one button for a changeable feature. Accordingly, a user may, for example, only need to remember one feature associated with a card. A credit account may include rewards such as points, cash-back, or miles from the card issuer. Accordingly, pushing the payment account button may earn the user such rewards. Pushing the changeable feature button may, alternatively, for example, not earn the user such rewards and may instead initiate a changeable feature. In doing so, for example, the cost of providing a card may be reduced in that the cost of rewards for the card may be reduced. A feature may include, for example, a feature from the card issuer, such as the ability for a user to earn a particular amount of points (e.g., 100) for a particular dollar amount added to a purchase (e.g., $1).

An application associated with a changeable feature button may, for example, initiate network features 245/246 (e.g., a piggyback transaction) to occur in addition to a purchase transaction being initiated by a card or device. For example, a changeable feature button may be pressed and associated payment information may be communicated that may cause a third party to charge additional funds as a second transaction (e.g., a piggyback transaction) that may be associated with a first transaction. Accordingly, for example, a customer may receive goods and/or services from the third party once the piggyback transaction settles in addition to any goods and/or services that may have been purchased by the customer during the first transaction. A remote processing facility may, for example, provide zone-based networking functions to process the various transactions (e.g., piggyback transactions, statement credit transactions, return transactions, partial return transactions, adjustments and chargebacks) as may associated with virtual button 213 and/or virtual button 214.

Figure 3:
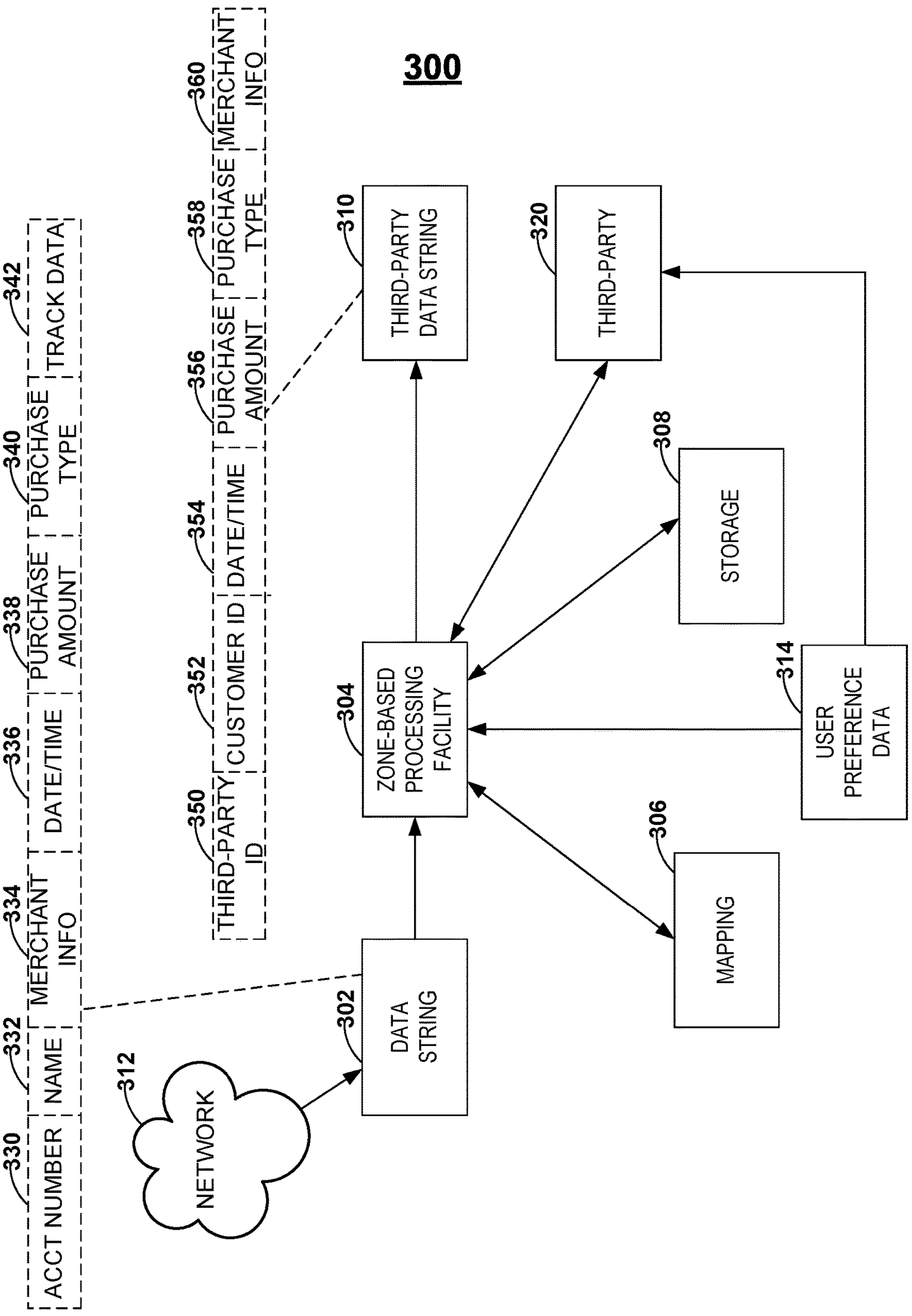
FIG. 3 is an illustration of a data flow constructed in accordance with the principles of the present invention.

FIG. 3 shows data flow 300 that may, for example, include network 312 (e.g., a network of issuers, merchants, merchant acquirers/processors, and any other network entity), data string 302, zone-based processing facility 304, mapping 306, storage 308, user preference data 314, and third-party data string 310.

A user may, for example, initiate a purchase transaction within network 312, such that the user may have requested additional functionality associated with the transaction. A user may, for example, complete a purchase transaction establishing a communication (e.g., an electromagnetic communication) between the user's payment device and a merchant's point-of-sale terminal where a payment message (e.g., a magnetic stripe payment message) may be communicated to complete the purchase transaction and additional information (e.g., information associated with a particular button on the user's payment device) may be communicated (e.g., communicated within discretionary data fields within the magnetic stripe message) to a network entity.

The payment message may be received by a network entity (e.g., an issuer and/or a processor) within network 312 to complete the requested purchase transaction. The network entity may, for example, forward a data string (e.g., data string 302) to zone-based processing facility 304 based on the requested purchase transaction. Data string 302 may, for example, contain data associated with the purchase transaction (e.g., payment account number, payment account holder's name, track data, merchant type, merchant location, types of goods purchased, amount of purchase, and transaction type).

Zone-based processing facility 304 may receive data string 302 and may process data string 302 (e.g., parse data string 302) to obtain individual data components contained within data string 302. Accordingly, for example, zone-based processing facility 304 may separate information pertaining to purchase authorization (e.g., payment account number and cardholder name) from information pertaining to, for example, the shopping habits of the user (e.g., merchant info, date/time of purchase, purchase type and purchase amount). Data string 302 may, for example, contain magnetic stripe data 342 (e.g., Track 1 data and Track 2 data). Data string 302 may, for example, contain a subset of magnetic stripe data (e.g., discretionary data fields contained within Track 1 and/or Track 2 data).

Mapping 306 may, for example, exist locally within zone-based processing facility 304. Mapping 306 may, for example, be accessed remotely by zone-based processing facility 304. Enhanced digital and/or physical security measures may be taken to protect the contents of mapping 306 from unauthorized access.

A data lookup function may be performed by zone-based processing facility 304, such that account identifying information (e.g., personal account number 330) may be provided to mapping 306. Mapping 306 may receive the account identifying information and may return a corresponding customer identification. For example, mapping 306 may be a database containing payment account numbers associated with one or more users. Each payment account number contained within mapping 306 may, for example, correlate to an associated customer ID (e.g., a token uniquely associated with the user).

Zone-based processing facility 304 may scrub data string 302 to remove sensitive information from data string 302. For example, sensitive information (e.g., personal account number 330 and account holder name 332) of data string 302 may be stripped by zone-based processing facility 304 and replaced with customer information received from mapping 306. Accordingly, for example, sensitive purchase account information associated with each data string 302 may be destroyed once data string 302 is correlated to its associated customer ID. In so doing, for example, a scrubbed and sanitized version of data string 302 may be stored within storage 308.

Zone-based processing facility 304 may retrieve scrubbed and sanitized information from storage 308. Storage 308 may, for example, exist locally within zone-based processing facility 304. Storage 308 may, for example, be accessed remotely by zone-based processing facility 304.

Zone-based processing facility 304 may retrieve information from storage 308 and may, for example, generate third-party data string 310 for delivery to third-party applications. Third-party data string 310 may, for example, contain information that may be value added to third-party applications and may be devoid of sensitive information associated with users.

Third-party data string 310 may, for example, contain third-party ID 350, which may be generated by zone-based processing facility 304 in response to information (e.g., discretionary data fields of track data 342) and user preference data 314. For example, track data 342 when construed in association with user preference data 314 may indicate which third-party application is to receive third-party data string 310. Accordingly, for example, zone-based processing facility 304 may generate third-party ID 350 in accordance with track data 342 and user preference data 314. Track data 342 in association with user preference data 314 may, for example, define what types and quantities of information are to be provided within third-party data string 310. Accordingly, for example, one or more data fields (e.g., data fields 354-360) may be populated within third-party data string 310 in accordance with track data 342 and associated user preference data 314. Merchant info 360 may be provided in greater detail (e.g., may include both the name and address of the merchant) as compared to merchant info 334 which may contain only general data about the merchant (e.g., name only).

Third-party data string 310 may, for example, contain customer ID 352, which may be generated by zone-based processing facility 304 in response to information (e.g., a unique customer token) that may be contained within storage 308. Customer ID 352 may, for example, depend at least in part upon which third-party application is to receive third-party data string 310 (e.g., as may be defined by third-party ID 350). For example, a user may be associated with several third-party applications. Accordingly, for example, one user may be associated with multiple customer IDs. In so doing, for example, third-party data string 310 may contain customer ID 352 that is different for each third-party ID 350, but nevertheless identifies the same user.

One of many third-parties (e.g., third party 320) may receive third-party data string 310. Customer ID 352 may uniquely identify which user may be associated with third-party data string 310. Accordingly, for example, third-party 320 may initiate one or more transactions on behalf of the user depending upon which of the one or more transactions the user has selected (e.g., as determined by user preference data 314) to be associated with the transaction that caused data string 302 to be received by zone-based processing facility 304.

For example, a user may define user preference data 314 to direct third-party 320 to charge additional funds against the user's payment account after third-party data string 310 is received by third party 320. Such additional funds may, for example, be used to purchase goods and/or services that may be offered by third party 320 (e.g., a collection of sports memorabilia cards from Upper Deck). Accordingly, for example, upon receipt of third-party data string 310, third-party 320 may request zone-based processing facility 304 to process a payment for goods and/or services provided by third party 320 in accordance with configurable information (e.g., user preference data 314).

Figure 4:
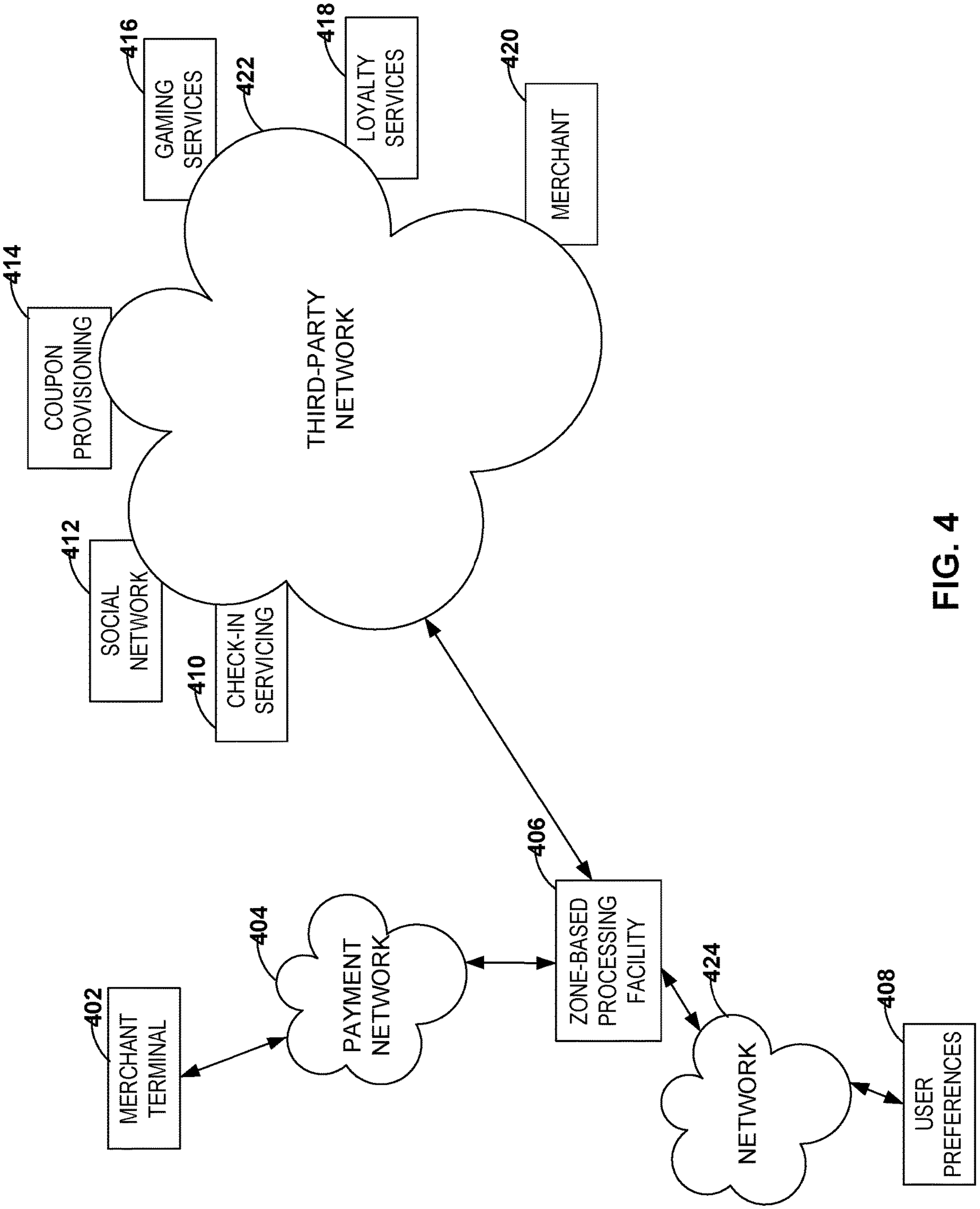
FIG. 4 is an illustration of a network constructed in accordance with the principles of the present invention.

FIG. 4 shows network 400 that may include third-party network 422 and various third-party applications 410-420. Network 400 may, for example, include merchant terminal 402 (e.g., a magnetic stripe reader, an EMV reader, an RFID reader, or an NFC reader) that may accept transactions (e.g., point-of-sale transactions) and may complete such transactions via payment network 404. Payment network 404 may, for example, include issuers, merchant acquirers, processors, and/or any other network entities that may be required to process and settle transactions initiated by merchant terminal 402.

Zone-based processing facility 406 may, for example, receive messages from payment network 404 (e.g., from a processor within payment network 404) that may be related to at least a portion of transactions conducted within payment network 404. Customers associated with zone-based processing facility 406 may, for example, elect to distribute at least a portion of data processed within payment network 404 with the various third-party applications of third-party network 422.

User preferences 408 may be selected by each customer to, for example, define what data, if any, may be provided to zone-based processing facility 406 by payment network 404. A customer may select (e.g., via user preferences 408) at least a portion of the data provided by payment network 404 to zone-based processing facility 406 that may be shared with third-party applications 410-420.

Network 424 (e.g., the internet) may be accessed by a user to define user preferences 408, which may determine how payment network 404, zone-based processing facility 406, third-party network 422, and third-party applications 410-420 interact for every transaction conducted by each user. A user may, for example, present a non-powered card to merchant terminal 402 to complete a particular purchase transaction. User preferences 408 may, for example, be defined by the user to allow details of such a transaction to be communicated by payment network 404 to zone-based processing facility 406, which may then share at least a portion of such details with one or more third-party applications 410-420. A customer may, for example, present a powered card to merchant 402 to complete a purchase transaction. Prior to presentment, the customer may have selected (e.g., via one or more button presses on the powered card) one or more additional actions to be taken besides the processing of a purchase transaction by payment network 404 in accordance with user preferences 408.

A user may, for example, press a button on a powered card that may be associated with communicating a payment message (e.g., a magnetic stripe message) to merchant terminal 402. Such a button press may, for example, further populate the magnetic stripe message (e.g., populate a discretionary data field within the magnetic stripe message)

with a directive to share at least a portion of purchase transaction details conducted at merchant terminal 402 with a particular third-party application (e.g., merchant 420). User preferences 408 may, for example, be selected by the user to determine which actions are to be conducted by the third-party application.

A user may press a button on a powered card that in accordance with user preferences 408 may, for example, cause a data string to be communicated from payment network 404 (e.g., from a processor within payment network 404) to zone-based processing facility 406 that may contain details of a purchase transaction initiated at merchant terminal 402. Zone-based processing facility 406 may, for example, compare user information (e.g., payment account number and/or payment account holder's name) that may be contained within the data string to a user database to obtain a customer ID (e.g., a customer token) that may be associated with the user information. Sensitive information within the data string (e.g., payment account number and/or payment account holder's name) may be replaced with the customer token and then stored either locally within zone-based processing facility 406 or remotely.

The data string, for example, may further contain information that may be indicative of which button was pressed on the powered card before being presented to merchant terminal 402. Using the button press information in addition to user preferences 408, zone-based processing facility 406 may populate a third-party message with details that may be communicated to a third-party application (e.g., merchant 420).

As per an example, a user may elect to share certain transaction information with merchant 420 each time a certain button is pressed on the user's powered card or device before presentment to merchant terminal 402 for payment. Such information may include, for example, merchant information (e.g., merchant's address), date/time information of the purchase, amount of the purchase, type of purchase made, and any other information (e.g., the customer ID associated with the customer's merchant account) that may be selected by the user via user preferences 408. Accordingly, for example, the selected information may be automatically gathered by zone-based processing facility 406, populated within a third-party message and communicated to merchant 420 via third-party network 422 (e.g., the internet).

Upon receipt of the third-party message, merchant 420 may initiate a second transaction (e.g., a piggyback transaction or statement credit transaction). The second transaction may be communicated to zone-based processing facility 406 via third-party network (e.g., the internet) and processed by zone-based processing facility 406 accordingly.

Figure 5:
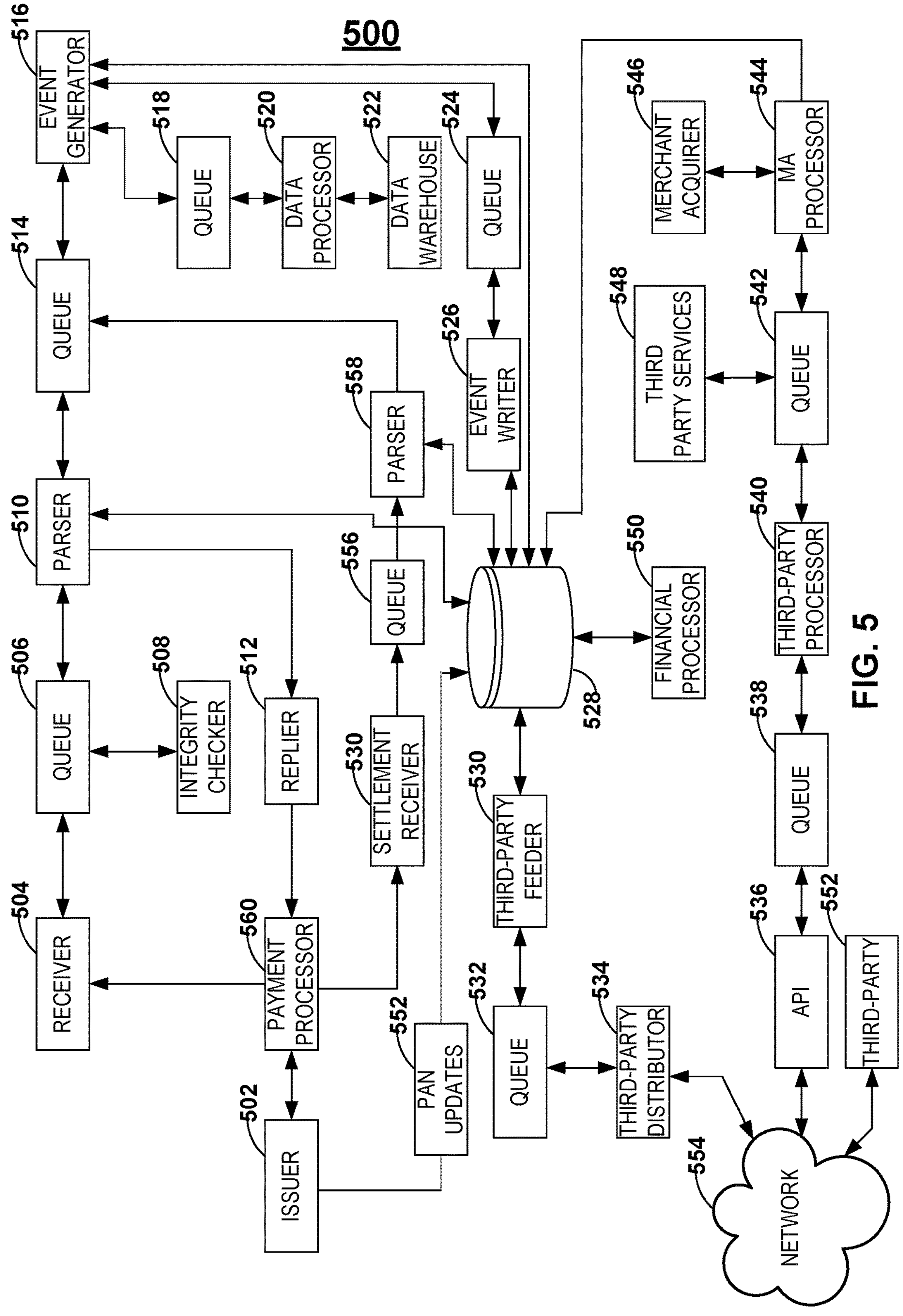
FIG. 5 is an illustration of a network constructed in accordance with the principles of the present invention.

FIG. 5 shows network 500. Purchase transactions may be processed for a merchant by a merchant acquirer (not shown) where a payment message based on the purchase transaction may be forwarded by the merchant acquirer to an issuer (e.g., issuer 502) and/or an issuer's payment processor (e.g., payment processor 560) via a payment network (e.g., VISA or MasterCard).

Receiver 504 may receive an advice message from payment processor 560 that may contain certain details about a purchase transaction (e.g., merchant type, merchant location, time of day, amount spent) and may further contain magnetic stripe information (e.g., Track 1 and Track 2 data). Alternatively, magnetic stripe information provided by the advice message may contain only a subset of Track 1 and Track 2 data (e.g., only the discretionary data fields of Track 1 and/or Track 2).

Replier 512 may provide status updates to payment processor 560 to, for example, relay to payment processor 560 that receiver 504 is operational during periods of non-activity (e.g., during a period where a lack of purchase transactions are being processed by a payment processor 560). Receiver 504 may, for example, receive the advice message via a network connection (e.g., a socket connection via SSL or TLS) from payment processor 560. Receiver 504 may, for example, comprise two or more receivers which may receive advice messages from two or more socket connections (e.g., via two or more payment processors 560).

Advice messages received by receiver 504 may be written to queue 506 (e.g., a transactional queue). Accordingly, receiver 504 may receive many advice messages and each advice message may be properly queued for processing within queue 506 without danger of being lost or destroyed. Alternatively, for example, queue 506 may be comprised of multiple queues (e.g., three non-transactional queues). The non-transactional queues may include a primary queue, a backup queue and a completed queue. Accordingly, advice messages may be written by receiver 504 to both the primary and backup queues for redundancy, while the completed queue may be reserved for tracking completion status of advice message processing. Once an advice message is processed (e.g., by parser 510), it may be written to the completed queue. Once written, both the completed advice message and its counterparts in both the primary and backup queues may be erased (e.g., by integrity checker 508) to free space in the queues for processing of subsequent advice messages.

A time-out period may exist within the primary and/or redundant queues, such that if a period of time expires (e.g., 1-2 minutes) before advice message processing completes, then integrity checker 508 may rewrite the uncompleted advice message from the backup queue back into the primary queue. In so doing, the possibility of ignoring an advice message may be minimized (e.g., decreased to zero).

Parser 510 may, for example, include one or more parsers that may pull advice messages from queue 506. Additional instances of parser 510 may, for example, be created so as to provide enough processing power to handle all advice messages received. Advice messages may be pulled from a single queue (e.g., the primary queue of queue 506), such that each parser 510 may request an advice message from queue 506 and queue 506 may provide the next available advice message to the requesting parser 510. Parsers 510 process each advice message by parsing individual data components from the advice message into an internal object that may be more easily manipulated. Parsers 510 may, for example, remove sensitive information from each advice message (e.g., payment account number and payment account holder's name) and may replace the sensitive advice message with received unique user identifiers (e.g., as may be received from database 529). Parsed and sanitized advice messages may be written to queue 514 (e.g., a 3-stage, non-transactional queue structure) which may be processed by event generator 516. Parsed and sanitized advice messages may be written from event generator 516 into queue 518 (e.g., a 3-stage, non-transactional queue structure) and processed by data processor 520 for long-term storage within data warehouse 522.

Once an advice message is fully parsed, the advice message may be written into the completed queue of queue 506 and a parsed advice message (or a variation of a parsed advice message) may be written to replier 512 as a reply message (e.g., an advice reply message). The advice reply message may then be communicated to payment processor 560 to confirm that advice message parsing is complete (e.g., enough of the original advice message may be repeated within the advice reply message to insure to payment processor 560 that the advice message has been properly processed).

Integrity checker 508 may detect that parsing and sanitizing of an advice message is completed by inspecting the contents of the completed queue of queue 506 against the contents of the primary queue of queue 506. When a match exists, integrity checker 508 may delete the advice message from both the primary queue and the completed queue of queue 506.

Parsed and sanitized advice messages (e.g., trevents) may be stored within database 528 via queue 524 (e.g., a 3-stage, non-transactional queue structure) by event writer 526. Each trevent stored within database 528 may, for example, be directed to a third-party application (e.g., a social network application, a coupon application, a gaming application, and/or a merchant). Third-party feeder 530 may search database 528 for trevents that have yet to be communicated to a third-party application. Once found, third-party trevents may be queued within queue 532 (e.g., a 3-stage, non-transactional queue structure) and distributed to third-party applications via third-party distributor 534. Trevents may be provided to third-party application(s) (e.g., third-party 552) via a number of communication mechanisms (e.g., via a socket port, a web service, or a web address) of network 554 (e.g., the internet).

The third-party application(s) may then acknowledge receipt of the trevents via API 536. API 536 may, for example, comprise web servers. Alternatively, API 536 may comprise a web address that may communicate data via "post" operations and "get" operations.

Third-party applications may, for example, report the completion of processing of a particular trevent via API 536. For example, a third-party trevent may comprise checking a user in at a particular coffee shop using a payment transaction conducted by the user at the coffer shop. Accordingly, for example, a third-party application may complete processing of a trevent once the transaction and appearance of the user at the coffee shop is reported to a social network of the user's choosing (e.g., Facebook or Twitter).

Third-party applications may, for example, request financial transactions (e.g., piggybacks, statement credits, returns, partial returns, adjustments, and chargebacks) via API 536. Financial transaction requests may be queued within queue 538 (e.g., a 3-stage, non-transactional queue structure) for processing by third-party processor 540 and queued within queue 542 (e.g., a 3-stage, non-transactional queue structure) for processing by third-party services 548 and/or merchant acquirer (MA) processor 544.

As per an example, a user may indicate (e.g., via a web-based application management tool) that purchases made with the user's card or device after a particular button was pressed on that card or device may cause a message to be routed to a third-party application (e.g., Upper Deck) for additional functionality. A user may, for example, indicate (e.g., via a web-based application management tool) that additional payment functionality may, for example, cause the third-party application to request that a separate transaction (e.g., a piggyback transaction) be conducted. Accordingly, for example, upon the initial payment transaction request by a user at a merchant's point-of-sale terminal, a message may be communicated to a third-party application and a piggyback transaction may be automatically requested by the third-party application based upon the user's preferences (e.g., as may be preselected via a web-based application management tool).

Parsers 510 and 558 may access database 528 with certain account information (e.g., a personal account number) and may receive a generic user ID (GUID) in response. Accordingly, for example, parsers 510 and 558 may replace sensitive information contained within their respective advice and batch messages with the GUIDs received from database 528. Personal account number (PAN) updates 552 may, for example, be received on a routine basis (e.g., nightly) from a network entity (e.g., issuer 502 and/or payment processor 560) to update database 528 with any changes to any information (e.g., personal account numbers) that may be contained within database 528. Such changes may be representative of lost or stolen personal account numbers that may be replaced with new personal account numbers for the same user.

Advice messages received by receiver 504 may, for example, be advice messages received as a result of a payment authorization message received from a network entity (e.g., payment processor 560). Advice messages received by settlement receiver 530 may, for example, be batch messages (e.g., settlement transactions, piggyback transactions, and statement credit transactions) received from a network entity (e.g., payment processor 560) at regular time intervals (e.g., every night). Accordingly, for example, for each authorization advice message processed by parser 510, there may exist a corresponding settlement advice message processed by parser 558. In so doing, for example, event generator 516 may verify that each payment authorization has actually settled.

Figure 6:
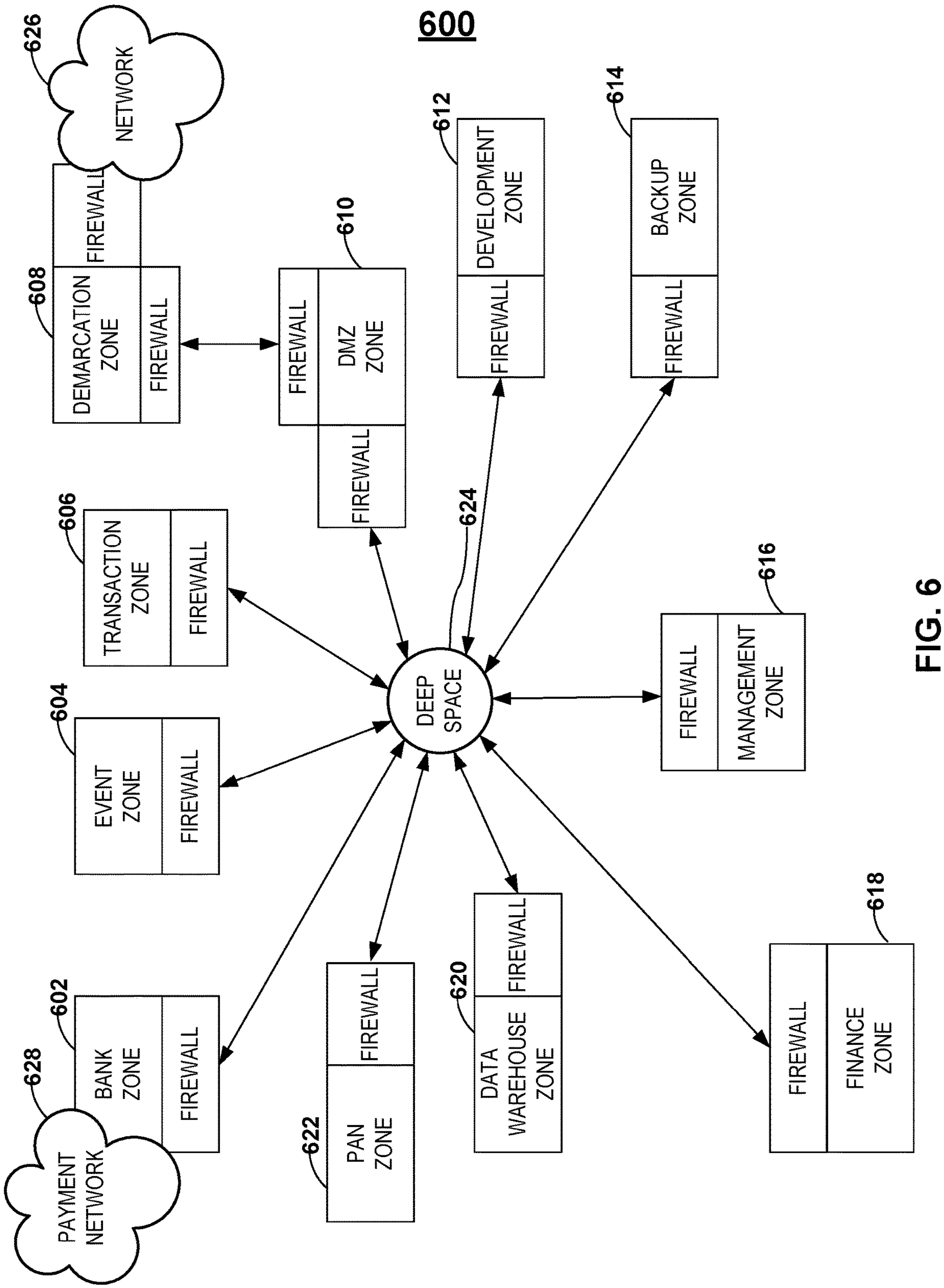
FIG. 6 is an illustration of a network constructed in accordance with the principles of the present invention.

FIG. 6 shows zone-based network 600 of a remote facility. Zone-based network 600 may include processing zones 602-622 of a processing facility that may interact with one another according to rules established by deep space 624 as well as rules established within each firewall of each processing zone. Deep space 624 may include a network component (e.g., a switch) that may direct communications from any one of processing zones 602-622 to any one or more other processing zones 602-622 via their respective firewalls.

Each processing zone may include a firewall (e.g., a software based firewall) that may interact with deep-space switch 624 to prevent unauthorized access to its associated processing zone. For example, a firewall resident within a processing zone may not respond to any IP address discovery requests (e.g., pings) so as to avoid unauthorized discovery of the deep-space IP address of each firewall. Such an architecture may enforce security contexts, such that zones operating within the same security context may communicate with one another, while zones operating within different security contexts (e.g., upper or lower security contexts) may not be authorized to communicate with one another. Other attacks (e.g., IP scanning techniques) may be defended against by deep-space switch 624 through implementation of an intrusion detection system (IDS) that may use a signature database to trigger intrusion alarms.

Network 626 (e.g., the internet) may access network 600 via demarcation zone 608 and DMZ zone 610. Demarcation zone 608 and DMZ zone 610 may, however, implement one or more layers of firewalls to protect against unauthorized access and hostile attacks. Third-party applications may, for example, access a developer API website within DMZ zone 610 so as to develop applications that may communicate with portions of zone-based network 600 (e.g., event zone 604) via deep-space switch 624. As per another example, third-party applications requesting transactions (e.g., piggyback transactions and statement credit transactions) may access DMZ zone 610 by way of demarcation zone 608 and deep-space switch 624 via an API that may exist within DMZ zone 610 to allow such communications to occur.

Third-party developers resident within network 626 may access DMZ zone 610 via demarcation zone 608. Accordingly, for example, third-party developers may access a sandbox environment that may reside within DMZ zone 610 to allow third-party software developers to test their code in a protected mode of operation without affecting "live" processes running within zone-based network 600. DMZ zone 610 may, for example, provide a simulated environment within which developers may test their code under simulated conditions. In so doing, for example, third-party developer's code may be fully debugged, verified, and certified to be operational by allowing the third-party code to be tested within a simulation environment of DMZ zone 610.

Third-party applications may interact with event zone 604 via DMZ zone 610 and deep-space switch 624. For example, a third-party API may reside within DMZ zone 610 that may communicate with processors that may be resident within event zone 604. A third-party distributor process may, for example, reside within event zone 604 to communicate trevents to third-party applications (e.g., a sanitized authorization advice message may be communicated to a third party via event zone 604 and DMZ zone 610). A third party may, for example, respond to an authorization advice trevent by acknowledging receipt via an API that may exist within DMZ zone 610. Additionally, for example, depending upon functionality selected by a cardholder (e.g., via a web-based application manager), the third party may initiate a secondary transaction (e.g., a piggyback transaction based upon an authorization advice message received by the third party) on behalf of the cardholder via an API that may exist within DMZ zone 610.

Payment network 628, such as a network of issuers, payment processors, merchant acquirers, and any other network entity that may be involved with processing of payment transactions may access zone-based network 600 via bank zone 602. A network entity (e.g., a payment processor) may, for example, access bank zone 602 to provide authorization advice messages that may be processed (e.g., sanitized) by a parsing process that may be resident within bank zone 602. The sanitized advice messages (e.g., trevents) may be provided to transaction zone 606 via deep-space switch 624 for trevent processing. A replier process that may be resident within bank zone 602 may, for example, respond with advice replier messages to inform the payment processor that the authorization advice message was received and processed. A settlement process may reside within bank zone 602 and may process (e.g., sanitize) other batch messages (e.g., settlement transactions, piggyback transactions, and statement credit transactions) to generate trevents that may be provided to transaction zone 606 via deep-space switch 624 for trevent processing. Sanitized advice messages, sanitized settlement messages, piggyback messages, statement credit messages and any other type of message generated within bank zone 602 may be communicated to transaction zone 606 via deep-space switch 624 for further processing.

A personal account number (PAN) update process may reside within bank zone 602 that may, for example, receive personal account updates that may be provided to PAN zone 622 from bank zone 602 via deep-space switch 624 for processing. For example, lost or stolen personal account numbers may need to be replaced by an issuer. In so doing, for example, an issuer within payment network 628 may provide such PAN updates to a PAN update processor resident within bank zone 602, which may then be forwarded onto PAN zone 622 via deep-space switch 624.

Data warehouse zone 620 may include processes that may communicate with event zone 604 via deep-space switch 624. For example, an SQL process may reside within data warehouse 620 to access trevents generated within event zone 604 via SQL queries for long-term (e.g., several years) storage of trevents within data warehouse zone 620.

Finance zone 618 may include financial management processes that may execute accounting procedures to monitor and control accounts (e.g., revenue and expense accounts) and account types (e.g., credit and debit account types) that may be affected by the various transactions processed by zone-based network 600. For example, a settlement transaction processed by bank zone 602 may result in revenue from an issuer of the card or device used to complete the purchase transaction to a processing facility (e.g., a remote processing facility that hosts zone-based network 600). In addition, the settlement transaction may result in an expense paid by the remote processing facility to a third party that may have performed additional processing based upon the authorization message that initiated the settlement message.

Management zone 616 and backup zone 614 may be accessible by all other processing zones of zone-based network 600 via deep-space switch 624 with a few optional exceptions (e.g., PAN zone 622 may be inaccessible due to the sensitive nature of data stored within PAN zone 622). Backup zone 614 may, for example, host backup storage devices (e.g., one or more multiple-terabyte storage devices) that may backup data from devices hosted by each of the other zones at regular intervals (e.g., 15 minute intervals). Management zone 616 may, for example, monitor the health of the devices hosted by each of the other processing zones of zone-based network 600 and may report problems to an operator. For example, an operator may be alerted as to a server failure in one of the processing zones. Accordingly, for example, the operator may swap the failed server with an operational server based upon an error message generated by management zone 616.

Management zone 616 may, for example, take steps to configure the replacement server for operation within zone-based network 600. As per an example, a receiver process may reside on a server within bank zone 602 that may receive authorization advice messages from a network entity (e.g., a payment processor within payment network 628) and place the authorization advice messages into a queue. A parser process may access the queue and may sanitize each authorization advice message by replacing sensitive data (e.g., a personal account number) with a generic user ID (GUID). The sanitized advice messages may be placed into another queue (e.g., a queue resident within bank zone 602) for processing by another process (e.g., a process resident within transaction zone 606). Accordingly, one or more queues may be automatically generated by management zone 616 within the replacement server of bank zone 602 so that advice message processing may proceed normally after the replacement server is brought up to operational status.

Process zones of zone-based network 600 may communicate with each other via their respective firewalls and associated deep-space addresses. Processes may communicate with other processes on a need-to-communicate basis. For example, bank zone 602 may communicate with PAN zone 622 because the firewall associated with bank zone 602 may know the deep-space address associated with the firewall of PAN zone 622. Accordingly, for example, bank zone 602 may retrieve sensitive information from PAN zone 622 via deep-space switch 624 when sanitizing payment messages received from payment network 628. Bank zone 602 and PAN zone 622 may be considered to be members of the same security context, which allows bank zone 602 to have knowledge of the deep-space address for PAN zone 622 and/or vice-versa. However, other process zone (s) (e.g., event zone 604) may not have access to PAN zone 622 simply because event zone 604 may not have a need to communicate with PAN zone 622 due to the sanitized nature of data with which event zone 604 may be operating.

Figure 7:
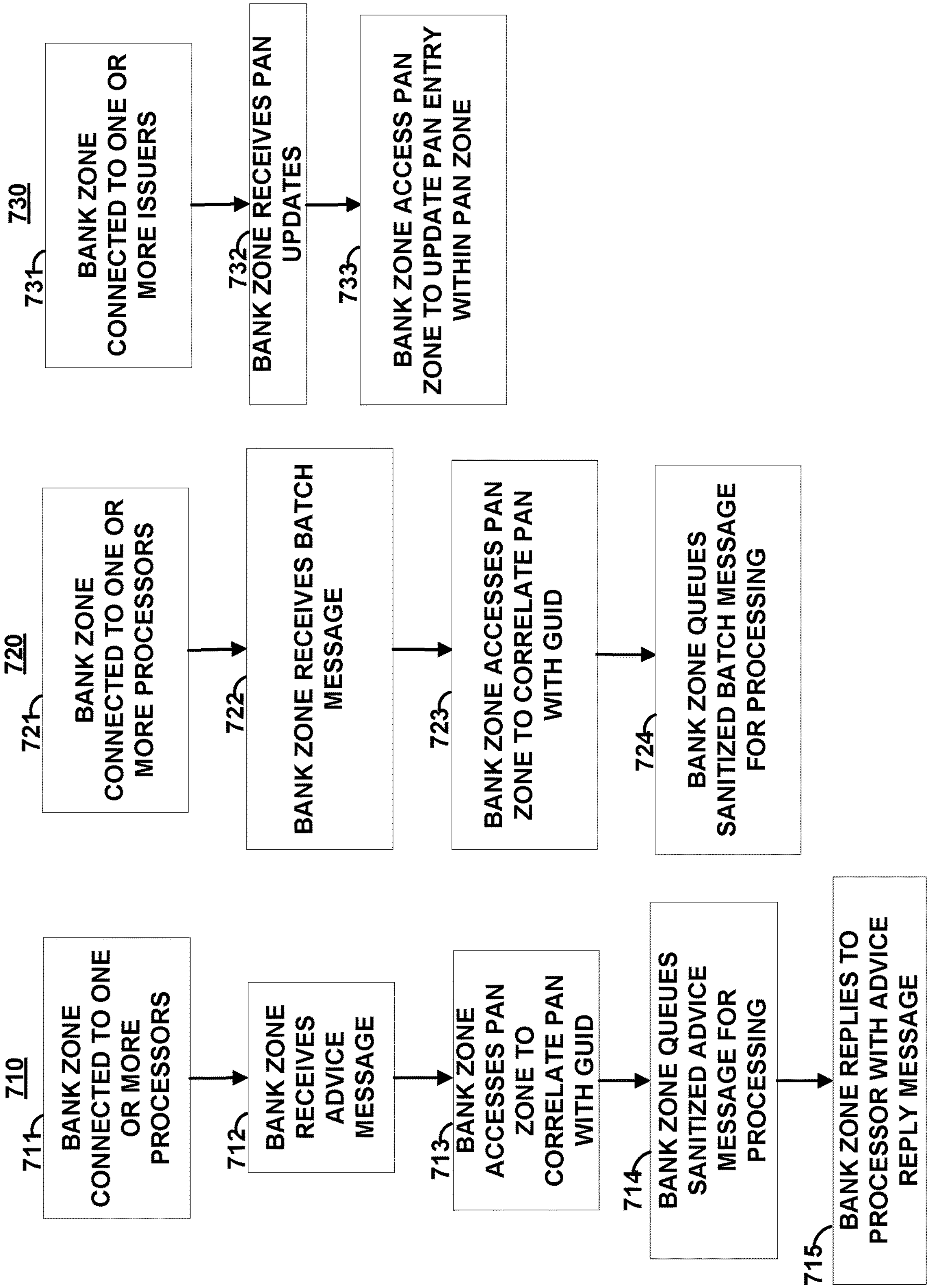
FIG. 7 is an illustration of process flow sequences in accordance with the principles of the present invention.
Figure 8:
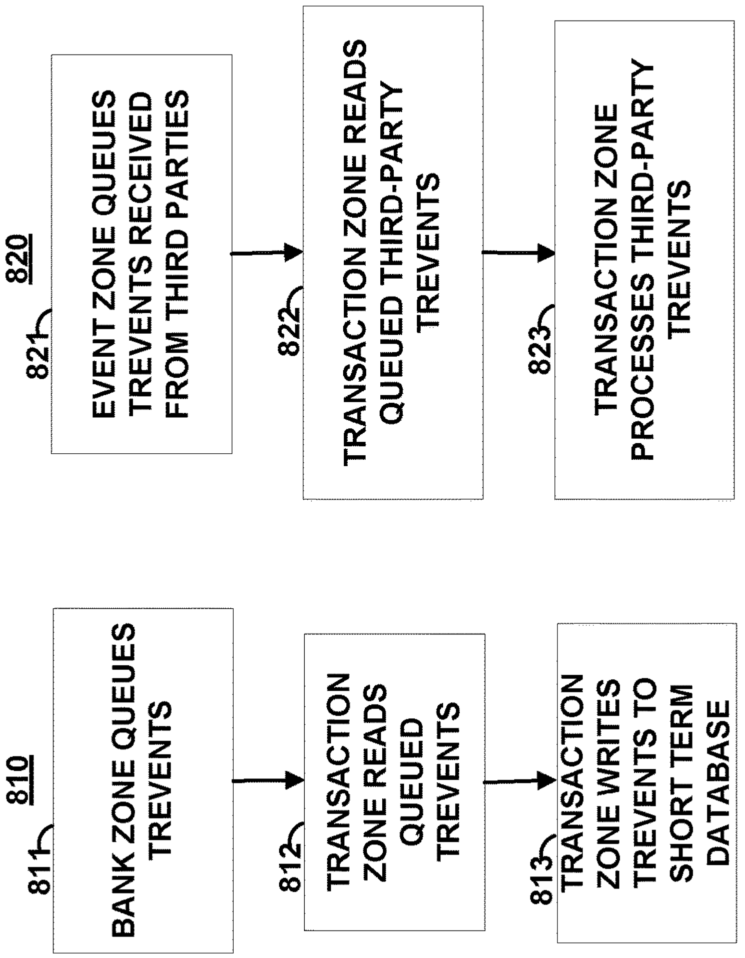
FIG. 8 is an illustration of process flow sequences in accordance with the principles of the present invention.
Figure 9:
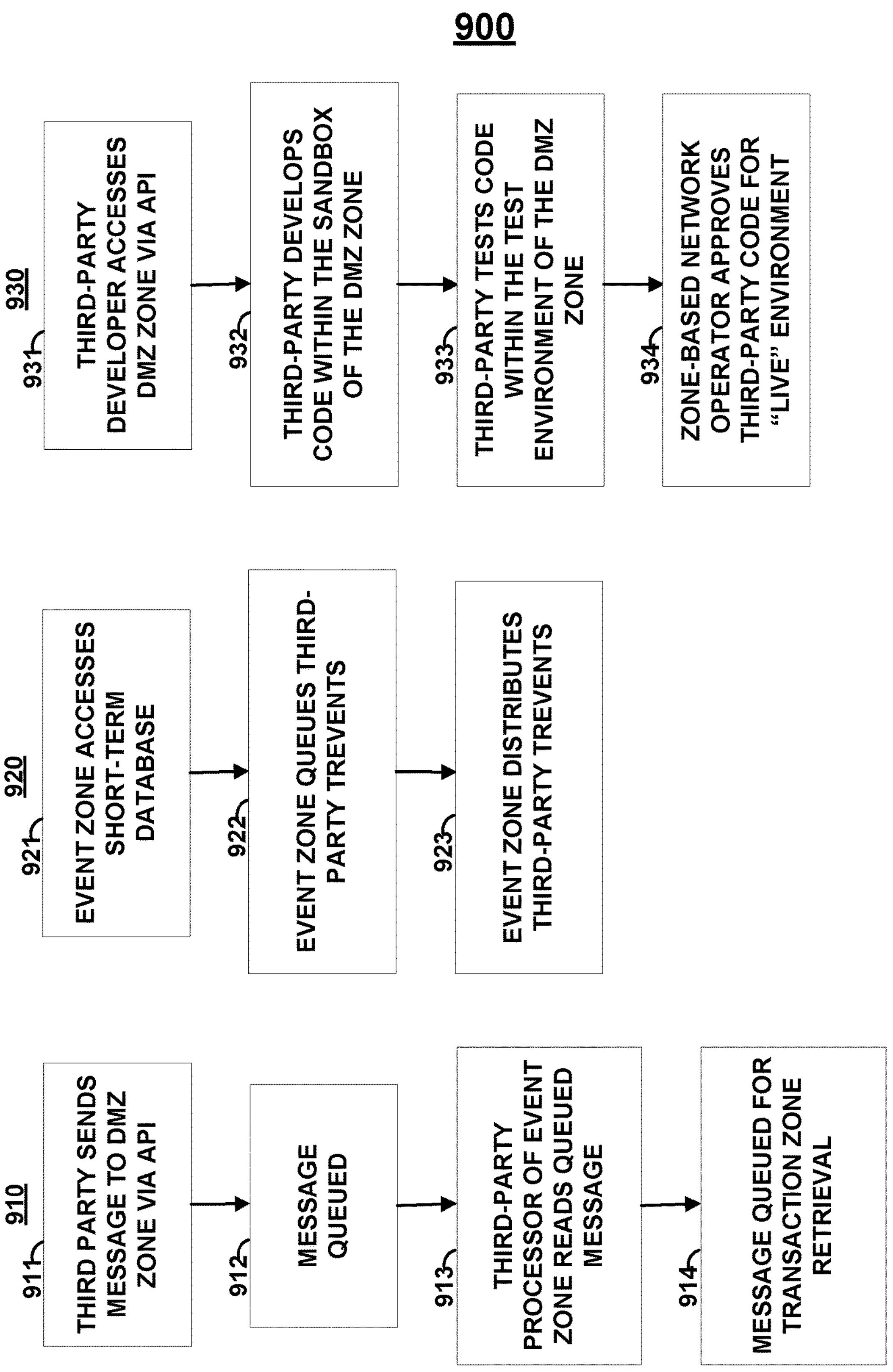
FIG. 9 is an illustration of process flow sequences in accordance with the principles of the present invention.
Figure 10:
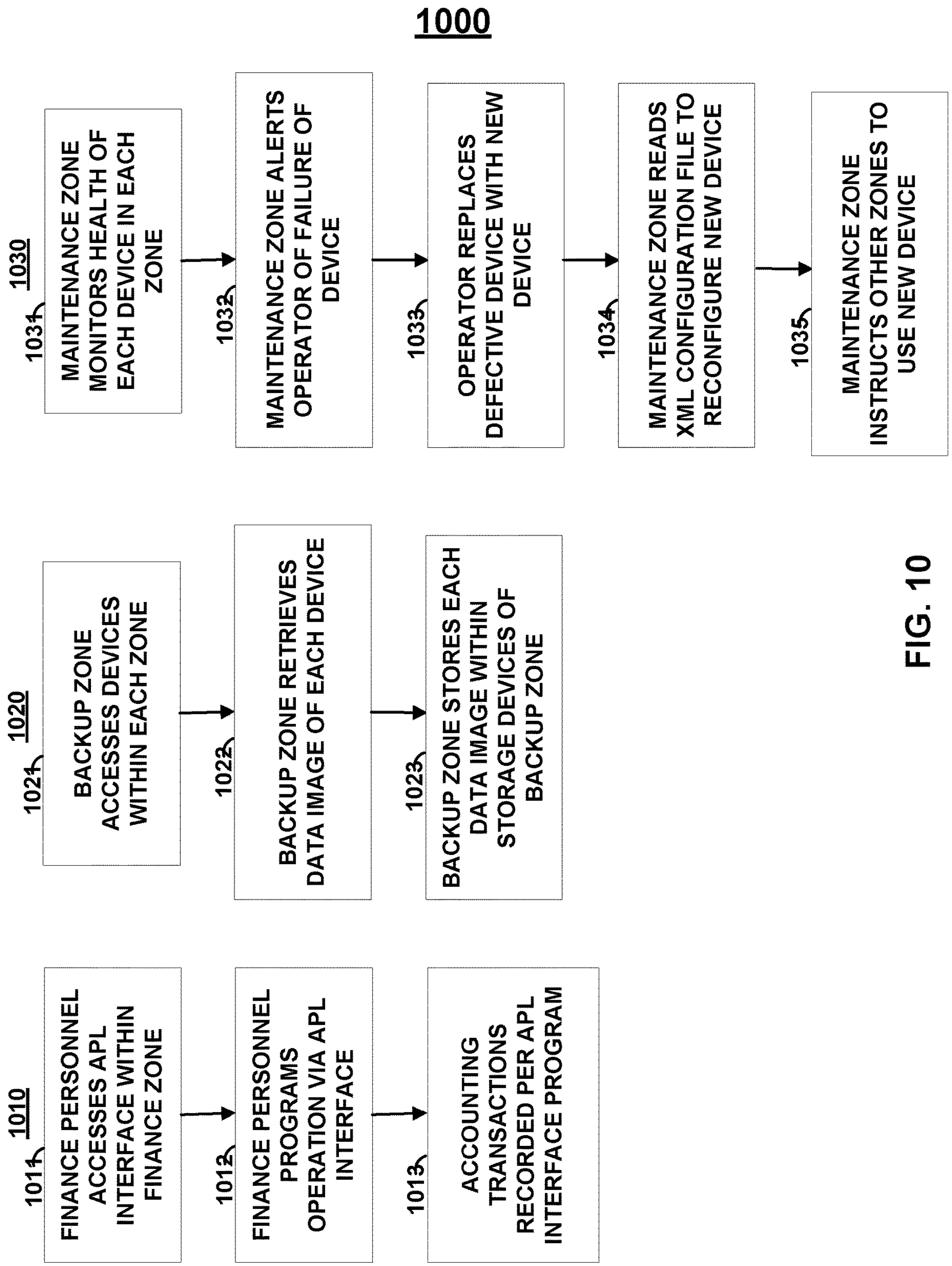
FIG. 10 is an illustration of process flow sequences in accordance with the principles of the present invention.

A flow diagram of process sequences is shown in FIG. 7. Step 711 of sequence 710 may, for example, connect a bank zone of a zone-based network to one or more network entities (e.g., payment processors). One or more of the payment processors may authorize a purchase transaction and may forward an authorization advice message to the bank zone (e.g., as in step 712). In step 713, a firewall of the bank zone may know the deep-space address of a PAN zone of the zone-based network and may, therefore, access the PAN zone for information. For example, the bank zone may forward a personal account number to the PAN zone and the PAN zone may return a generic user ID (GUID) associated with the personal account number to the bank zone. The bank zone may replace the personal account number of the authorization advice message with the GUID and may then queue the sanitized authorization advice message as a trevent for further processing (e.g., as in step 714). The bank zone may, for example, build an advice reply message and communicate the advice reply message back to the payment processor (e.g., as in step 715).

Step 721 of sequence 720 may, for example, connect a bank zone of a zone-based network to one or more network entities (e.g., payment processors). One or more of the payment processors may authorize several purchase transactions that may result in batch processing of settlements for each authorization given for the day (e.g., as in step 722). Other transactions, such as piggyback transactions and statement credit transactions, may also be communicated to the bank zone (e.g., as in step 722). In step 723, a firewall of the bank zone may know the deep-space address of a PAN zone of the zone-based network and may, therefore, access the PAN zone for information. For example, the bank zone may forward a personal account number to the PAN zone and the PAN zone may return a generic user ID (GUID) associated with the personal account number to the bank zone. The bank zone may replace the personal account number of each batch transaction with the GUID and may then queue the sanitized batch transaction message as a trevent for further processing (e.g., as in step 724).

Step 731 of sequence 730 may, for example, connect a bank zone of a zone-based network to one or more network entities (e.g., issuers). Each issuer may provide the bank zone with updated information (e.g., updated personal account numbers as in step 732). The bank zone may then access the PAN zone to update the PAN zone entry with the updated PAN information. The connection between the PAN zone and the bank zone may be possible since the bank zone firewall knows the deep-space address of the PAN zone firewall (and vice versa), which enables such communication.

In step 811 of sequence 810, a bank zone of a zone-based network may queue sanitized messages (e.g., trevents). A transaction zone of a zone-based network may read the queued trevents (e.g., as in step 812) and may write the trevents to short-term (e.g., 90 day) storage within a database. Such trevents may, for example, be sanitized authorization advice messages that may be stored and subsequently sent to third parties for further processing. Alternately, such trevents may, for example, be sanitized settlement, piggyback, or statement credit messages that are stored and subsequently sent to third parties for further processing. The connection between the transaction zone and the bank zone may be possible since the bank zone firewall knows the deep-space address of the transaction zone firewall (and vice versa), which enables such communication.

In step 821 of sequence 820, the event zone of a zone-based network may queue trevents received from third-parties. Such trevents may, for example, be requests from third parties to initiate a transaction (e.g., a piggyback transaction). A processor within a transaction zone of the zone-based network may read the queued trevents (e.g., as in step 822) and process them in accordance with the type of trevent (e.g., as in step 823) queued. For example, transaction trevents (e.g., piggyback trevents) may be forwarded onto a merchant acquirer processor for further processing. As per another example, general administrative trevents (e.g., status request messages sent by third parties) may be processed by a third-party service processor to provide general information back to the requesting third party (e.g., a third-party request for the number of subscribing users of a particular third party application). The connection between the transaction zone and the event zone may be possible since the event zone firewall knows the deep-space address of the transaction zone firewall (and vice versa), which enables such communication.

As per one example, the trevent may be a piggyback transaction request from a third party, which may be initiated by a processing facility that is hosting the zone-based network. Accordingly, for example, the processor of the transaction zone may access the PAN zone to retrieve personal account information associated with a user's card or device. The retrieved information may, for example, be associated with a purchase account of the card or device that initiated the original purchase transaction, which then caused the piggyback transaction to be requested from a third party. A payment message may, for example, be generated by the transaction zone processor, which may include the retrieved personal account information. The payment message may then be communicated to a network entity (e.g., a merchant acquirer) by the transaction zone processor, so that the piggyback transaction may be completed within a payment network. The transaction zone processor may also write the piggyback trevent to short-term (e.g., 90 day) storage within a database. The connection between the transaction zone and the PAN zone may be possible since the bank zone firewall knows the deep-space address of the transaction zone firewall (and vice versa), which enables such communication.

In step 911 of sequence 910, a third party may communicate a message (e.g., a piggyback transaction request) to a DMZ zone of a zone-based network. Such a DMZ zone may host an API for third-party access. The DMZ zone may queue the message for event zone retrieval (e.g., as in step 912). A processor within the event zone may read the queued message (e.g., as in step 913) and may queue the message for transaction zone processing (e.g., as in step 914).

In step 921 of sequence 920, an event zone of a zone-based network may access short-term (e.g., 90 day) storage within a database. A third-party feeder may retrieve trevents (e.g., a settlement trevent) from within the database and may queue the trevents for further processing (e.g., as in step 922). In step 923, a third-party distributor may retrieve the trevents from the queue and may access a network (e.g., the internet) via a DMZ zone of a zone-based network to distribute the trevents to the associated third parties that are to receive the trevents. Each of the DMZ zone, event zone, and transaction zone may communicate with each other since the deep-space address of each respective firewall of each respective zone may be known to each other.

In step 931 of sequence 930, a third-party software developer may access a DMZ zone of a zone-based network via an API website of the DMZ zone. In step 932, the third-party software developer may develop executable code within a sandbox environment of the DMZ zone (e.g., third-party applications that support a web-based application manager may be developed within the sandbox environment). A test environment may also be provided within the DMZ zone to allow developed executable code to be tested (e.g., as in step 933) in a simulated environment without danger of affecting "live" operations of the zone-based network. In step 934, an operator of the zone-based network may monitor testing of the third-party executable code to determine whether the executable code passes muster for the "live" environment. If so, the operator may approve the third-party executable code to be activated within the "live" environment.

In step 1011 of sequence 1010, finance personnel (e.g., an accountant) may access an accounting programming language (APL) interface hosted within a finance zone of a zone-based network. In step 1012, the accountant may access a graphical user interface (GUI) that may display the APL interface. The APL interface may, for example, graphically provide accounting parameter and associated parameter value selection mechanisms (e.g., textual input boxes, pull-down menus and radio buttons) to facilitate assignment of accounts (e.g., accounts receivable, accounts payable, expense and revenue accounts) and account types (e.g., credit and debit account types) that may be necessary to perform accounting actions related to transactions (e.g., trevents) that may be stored within a financial database. All accountings of transactions may operate in accordance with the APL interface selections made (e.g., as in step 1013).

In step 1021 of sequence 1020, a backup zone of a zone-based network may access devices in other zones of the zone-based network at regular time intervals (e.g., every 15 minutes). For each device in each zone, the backup zone may retrieve a data image (e.g., a complete data image of the device or a data image representing the difference between the last data image taken from the device and the present state of data in the device as in step 1022). For each data image taken, the backup zone may store the data image into storage devices contained within the backup zone (e.g., as in step 1023). Most, if not all, of the zones may communicate with the backup zone (e.g., a possible exception may include the PAN zone due to the sensitive nature of data stored within the PAN zone) since the deep-space address of each respective firewall of each respective zone may be known to the backup zone.

In step 1031 of sequence 1030, a maintenance zone may monitor the health of each device in every other zone (e.g., as in step 1031). If a device fails in any zone, the maintenance zone may alert an operator of the zone-based network of the failure of the device (e.g., as in step 1032). In step 1033, the operator may replace the defective device with a new device. The maintenance zone may read a configuration file (e.g., an XML configuration file as in step 1034) to reconfigure the new device for operation within the "live" network. For example, all queues that may be utilized on the new device may be automatically generated by the maintenance zone within the new device based upon the configuration details of the configuration file. Such configuration details may include the queue type (e.g., transactional or non-transactional), name of the queue, user permissions (e.g., security levels) that may be associated with usage of each queue, each user and its respective security level granted for each queue and any other configuration details that may be required for a given queue. Once the new device is completely configured by the maintenance zone, the maintenance zone may alert all other zones requiring access to the new device that the new device is ready for use and should be used until further notice (e.g., as in step 1035).

Figure 11:
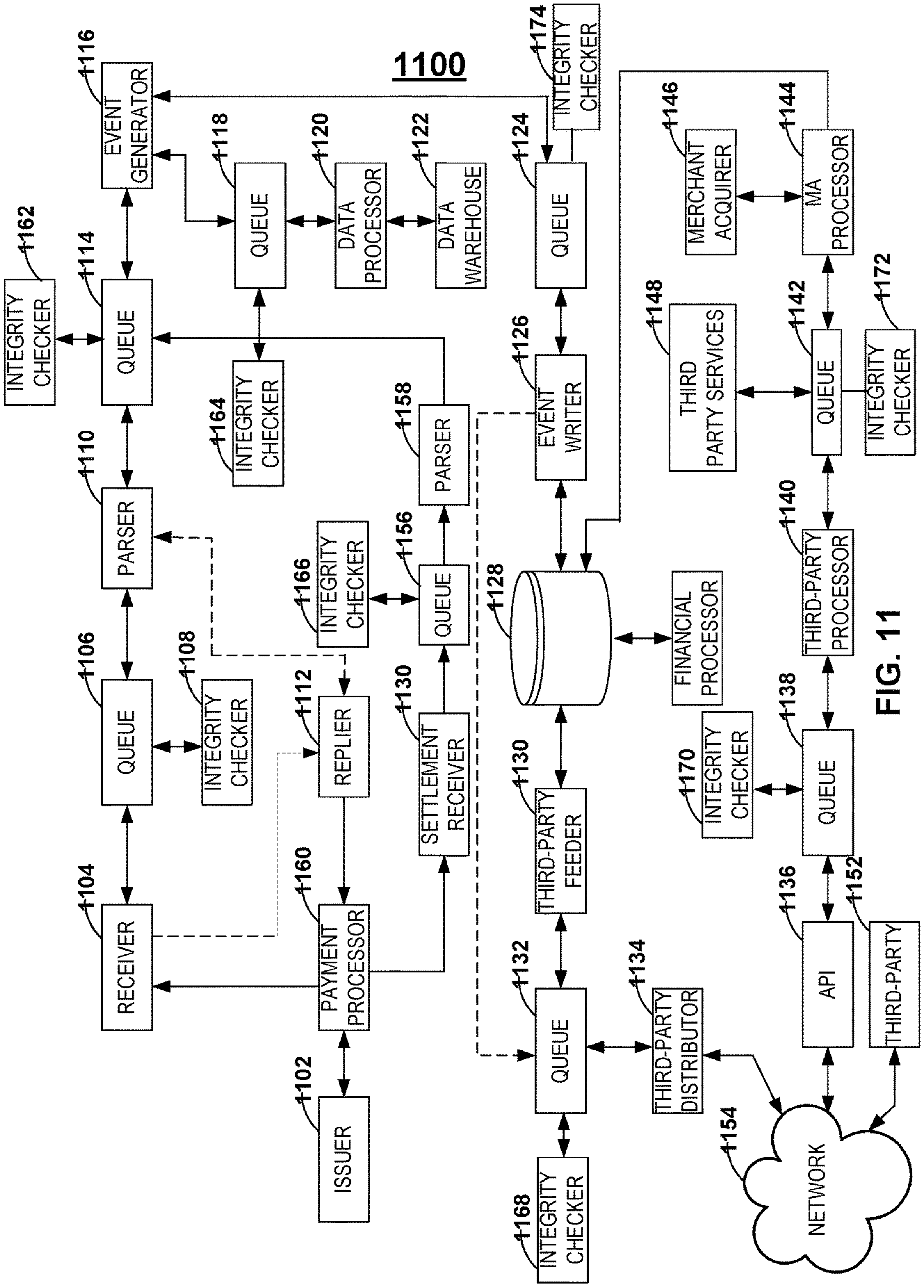
FIG. 11 is an illustration of a network constructed in accordance with the principles of the present invention.

FIG. 11 shows network 1100. Purchase transactions may be processed for a merchant by a merchant acquirer (not shown) where a payment message based on the purchase transaction may be forwarded by the merchant acquirer to an issuer (e.g., issuer 1102) and/or an issuer's payment processor (e.g., payment processor 1160) via a payment network (e.g., VISA or MasterCard).

Receiver 1104 may receive an advice message from payment processor 1160 that may contain certain details about a purchase transaction (e.g., merchant type, merchant location, time of day, amount spent) and may further contain magnetic stripe information (e.g., Track 1 and Track 2 data). Alternatively, magnetic stripe information provided by the advice message may contain only a subset of Track 1 and Track 2 data (e.g., only the discretionary data fields of Track 1 and/or Track 2).

Replier 1112 may provide status updates to payment processor 1160 to, for example, relay to payment processor 1160 that receiver 1104 is operational during periods of non-activity (e.g., during a period where a lack of purchase transactions are being processed by payment processor 1160). Receiver 1104 may, for example, receive the advice message via a network connection (e.g., a socket connection via SSL or TLS) from payment processor 1160. Receiver 1104 may, for example, comprise two or more receivers which may receive advice messages from two or more socket connections (e.g., via two or more payment processors 1160).

Advice messages received by receiver 1104 may be written to queue 1106 (e.g., a transactional queue). Accordingly, receiver 1104 may receive many advice messages and each advice message may be properly queued for processing within queue 1106 without danger of being lost or destroyed. Alternatively, for example, queue 1106 may be comprised of multiple queues (e.g., three non-transactional queues). The non-transactional queues may, for example, include a primary queue, a backup queue and a completed queue. Accordingly, advice messages may be written by receiver 1104 to both the primary and backup queues for redundancy, while the completed queue may be reserved for tracking completion status of advice message processing. Once an advice message is processed (e.g., by parser 1110), it may be written to the completed queue. Once written, both the completed advice message and its counterparts in both the primary and backup queues may be erased (e.g., by integrity checker 1108) to free space in the queues for processing of subsequent advice messages.

A time-out period may exist within the primary and/or redundant queues, such that if a period of time expires (e.g., 1-2 minutes) before advice message processing completes, then integrity checker 1108 may rewrite the uncompleted advice message from the backup queue back into the primary queue. In so doing, the possibility of ignoring an advice message may be minimized (e.g., decreased to zero).

Parser 1110 may, for example, include one or more parsers that may pull advice messages from queue 1106. Additional instances of parser 1110 may, for example, be created so as to provide enough processing power to handle all advice messages received. Advice messages may be pulled from a single queue (e.g., the primary queue of queue 1106), such that each parser 1110 may request an advice message from queue 1106 and queue 1106 may provide the next available advice message to the requesting parser 1110. Parsers 1110 may process each advice message by parsing individual data components from the advice message into internal objects that may be more easily manipulated. Parsers 1110 may, for example, remove sensitive information from each advice message (e.g., payment account number and payment account holder's name) and may replace the sensitive information with unique user identifiers. Parsed and sanitized advice messages may be written to queue 1114 (e.g., a 3-stage, non-transactional queue with integrity checker 1162) which may be processed by event generator 1116. Parsed and sanitized advice messages may be written from event generator 1116 into queue 1118 (e.g., a 3-stage, non-transactional queue with integrity checker 1164) and processed by data processor 1120 for long-term storage within data warehouse 1122.

Once an advice message is fully parsed, the advice message may be written into the completed queue of queue 1106 and a parsed advice message (or a variation of a parsed advice message) may be written to replier 1112 as a reply message (e.g., an advice reply message). The advice reply message may then be communicated to payment processor 1160 to confirm that advice message parsing is complete (e.g., enough of the original advice message may be repeated within the advice reply message to insure to payment processor 1160 that the advice message has been properly processed).

Alternately, for example, receiver 1104 may itself parse individual data components from the advice message prior to writing the parsed message to primary and backup queues 1106. Additionally, for example, receiver 1104 may provide the parsed message to replier 1112. In so doing, parser 1110 may not be required to communicate with replier 1112 at all. Instead, the parsed message may be communicated to replier 1112 by receiver 1104 and replier 1112 may communicate the advice reply message to payment processor 1160 based on the parsed message received from receiver 1104.

Integrity checker 1108 may detect that parsing and sanitizing of an advice message is completed by inspecting the contents of the completed queue of queue 1106 against the contents of the primary queue of queue 1106. When a match exists, integrity checker 1108 may delete the advice message from both the primary queue and the completed queue of queue 1106.

Parsed and sanitized advice messages (e.g., trevents generated by event generator 1116) may be stored within database 1128 via queue 1124 (e.g., a 3-stage, non-transactional queue with integrity checker 1174) by event writer 1126. Each trevent stored within database 1128 may, for example, be directed to a third-party application (e.g., a social network application, a coupon application, a gaming application, and/or a merchant). Third-party feeder 1130 may search database 1128 for trevents that have yet to be communicated to a third-party application. Once found, third-party trevents may be queued within queue 1132 (e.g., a 3-stage, non-transactional queue with integrity checker 1168) and distributed to third-party applications via third-party distributor 1134. Event writer 1126 may, for example, write trevents directly into queue 1132 instead of, or in addition to, writing trevents into database 1128. Accordingly, for example, an optimized trevent flow may result, where third-party feeder 1130 may provide a fail-safe mechanism. Trevents may be provided to third-party application(s) (e.g., third-party 1152) via a number of communication mechanisms (e.g., via a socket port, a web service, or a web address) of network 1154 (e.g., the internet).

The third-party application(s) may then acknowledge receipt of the trevents via API 1136. API 1136 may, for example, comprise web servers. Alternatively, API 1136 may comprise a web address that may communicate data via "post" operations and "get" operations.

Third-party applications may, for example, report the completion of processing of a particular trevent via API 1136. For example, a third-party trevent may comprise checking a user in at a particular coffee shop using a payment transaction conducted by the user at the coffee shop. Accordingly, for example, a third-party application may complete processing of a trevent once the transaction and appearance of the user at the coffee shop is reported to a social network of the user's choosing (e.g., Facebook or Twitter).

Third-party applications may, for example, request financial transactions (e.g., piggybacks, statement credits, adjustments, and chargebacks) via API 1136. Financial transaction requests may be queued within queue 1138 (e.g., a 3-stage, non-transactional queue with integrity checker 1170) for processing by third-party processor 1140 and queued within queue 1142 (e.g., a 3-stage, non-transactional queue with integrity checker 1172) for processing by third-party services 1148 and/or merchant acquirer (MA) processor 1144.

As per an example, a user may indicate (e.g., via a web-based application management tool) that purchases made with the user's card or device after a particular button was pressed on that card or device may cause a message to be routed to a third-party application (e.g., UpperDeck) for additional functionality. A user may, for example, indicate (e.g., via a web-based application management tool) that additional payment functionality may, for example, cause the third-party application to request that a separate transaction (e.g., a piggyback transaction) be conducted. Accordingly, for example, upon the initial payment transaction request by a user at a merchant's point-of-sale terminal, a message may be communicated to a third-party application and a piggyback transaction may be automatically requested by the third-party application based upon the user's preferences (e.g., as may be preselected via a web-based application management tool).

Such a piggyback transaction may include a second purchase transaction, where the third-party may sell goods to the user for value based upon the occurrence of the first purchase transaction. Accordingly, for example, the third party may request (e.g., via the piggyback transaction) that the user's card be charged an additional amount equal to the second purchase transaction amount.

Settlement files may, for example, be received regularly (e.g., nightly) by settlement receiver 1130 from a network entity (e.g., payment processor 1160). Such settlement files may, for example, result from financial transactions conducted during a time period (e.g., during a daytime period) and such financial transactions may include one or more of piggybacks, statement credits, returns, partial returns, adjustments, and chargebacks or any other transaction type. Such settlement files may, for example, be compared against authorization messages or their sanitized equivalent messages (e.g., trevent messages stored within database 1128) to reconcile each authorization message received from a network entity (e.g., payment processor 1160) with a corresponding settlement message.

Persons skilled in the art will also appreciate that the present invention is not limited to only the embodiments described. Instead, the present invention more generally involves dynamic information. Persons skilled in the art will also appreciate that the apparatus of the present invention may be implemented in other ways then those described herein. All such modifications are within the scope of the present invention, which is limited only by the claims that follow.

What is claimed is:

1. A method, comprising:

receiving an address discovery request by a first firewall of a first processing zone in a zone-based network;

determining, by the first firewall, to make no response to the address discovery request;

receiving, by the first firewall, a message from a second firewall of a second processing zone in the zone based network;

determining, by the first firewall, that the message includes a deep space network address associated with the first firewall; and communicating, by the first firewall, with a device of the first processing zone based on the deep space network address.

2. The method of claim 1, wherein said zone-based network comprises a network component operable to direct communications from any one of said plurality of processing zones to any one or more other processing zones via said firewalls.

3. The method of claim 1, wherein at least one of said first and second processing zones is a transaction zone.

4. The method of claim 1, wherein at least one of said first and second processing zones is a bank zone.

5. The method of claim 1, wherein at least one of said first and second processing zones is a PAN zone.

6. The method of claim 1, wherein at least one of said first and second processing zones is a development zone.

7. The method of claim 1, wherein the zone-based network comprises:

a network component operable to direct all communications between processing zones of said zone-based network.

8. The method of claim 1, wherein said first firewall is not operable to respond to IP address discovery requests based on a first security context.

9. The method of claim 1, wherein said first firewall and said second firewall are not operable to respond to IP address discovery requests.

10. The method of claim 1, wherein said first processing zone is a DMZ zone, and said second processing zone is a demarcation zone.

11. The method of claim 1, further comprising:

receiving a message from a third firewall in a third processing zone, said third processing zone operable within said first security context of said zone-based network, wherein said first firewall is operable to enforce said first security context by permitting communication with any processing zone of said zone-based network within a first security context.

12. The method of claim 1, wherein said first firewall is operable to enforce said first security context by permitting communication with a third processing zone of said zone-based network within a first security context.

* * * * *